(12) United States Patent
Desai et al.

(10) Patent No.: US 12,031,064 B2
(45) Date of Patent: *Jul. 9, 2024

(54) STRUCTURAL ADHESIVE COMPOSITIONS

(71) Applicant: PPG Industries Ohio, Inc., Cleveland, OH (US)

(72) Inventors: Umesh C. Desai, Wailuku, HI (US); Tien-Chieh Chao, Mars, PA (US); Masayuki Nakajima, Wexford, PA (US); Kaliappa G. Ragunathan, Waxhaw, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,727

(22) Filed: Mar. 17, 2022

(65) Prior Publication Data

US 2022/0213362 A1 Jul. 7, 2022

Related U.S. Application Data

(60) Continuation of application No. 17/198,504, filed on Mar. 11, 2021, now Pat. No. 11,629,276, which is a division of application No. 14/961,513, filed on Dec. 7, 2015, now Pat. No. 10,947,428, which is a continuation of application No. 13/918,021, filed on Jun. 14, 2013, now abandoned, which is a continuation-in-part of application No. 13/315,518, filed on Dec. 9, 2011, now abandoned, which is a continuation-in-part of application No. 12/949,878, filed on Nov. 19, 2010, now abandoned.

(51) Int. Cl.
| | | |
|---|---|---|
| C09J 163/00 | (2006.01) | |
| B32B 27/38 | (2006.01) | |
| B82Y 30/00 | (2011.01) | |
| C08G 59/06 | (2006.01) | |
| C08G 59/18 | (2006.01) | |
| C08G 59/20 | (2006.01) | |
| C08G 59/40 | (2006.01) | |
| C08G 59/42 | (2006.01) | |
| C08G 59/50 | (2006.01) | |
| C08G 59/56 | (2006.01) | |
| C08L 63/00 | (2006.01) | |
| C09J 5/00 | (2006.01) | |
| C09J 5/06 | (2006.01) | |
| C08K 3/04 | (2006.01) | |

(52) U.S. Cl.
CPC ............ *C09J 163/00* (2013.01); *B82Y 30/00* (2013.01); *C08G 59/066* (2013.01); *C08G 59/182* (2013.01); *C08G 59/184* (2013.01); *C08G 59/4276* (2013.01); *C08G 59/5006* (2013.01); *C08L 63/00* (2013.01); *C09J 5/00* (2013.01); *C09J 5/06* (2013.01); *C08K 3/04* (2013.01); *C08L 2205/02* (2013.01); *C09J 2463/00* (2013.01)

(58) Field of Classification Search
None
See application file for complete search history.

(56) References Cited

U.S. PATENT DOCUMENTS

| | | |
|---|---|---|
| 3,728,387 A | 4/1973 | Freis et al. |
| 3,756,984 A | 9/1973 | Klaren et al. |
| 3,816,365 A | 6/1974 | Fisch et al. |
| 3,860,541 A | 1/1975 | Lehmann et al. |
| 3,912,751 A | 10/1975 | Lund |
| 3,946,131 A | 3/1976 | Biefeld et al. |
| 3,949,140 A | 4/1976 | Biefeld et al. |
| 3,969,298 A | 7/1976 | Gasman |
| 3,985,807 A | 10/1976 | Grimm et al. |
| 3,985,825 A | 10/1976 | Schmid et al. |
| 4,005,055 A | 1/1977 | Miron et al. |
| 4,032,593 A | 6/1977 | Samejima |
| 4,091,001 A | 5/1978 | Berger |
| 4,107,116 A | 8/1978 | Riew et al. |
| 4,129,607 A | 12/1978 | Kooi et al. |
| 4,187,349 A | 2/1980 | Langer et al. |
| 4,304,694 A | 12/1981 | Scola et al. |
| 4,360,649 A | 11/1982 | Kamio et al. |
| 4,500,601 A * | 2/1985 | Whitcomb ............ C09D 5/002 528/392 |

(Continued)

FOREIGN PATENT DOCUMENTS

| | | |
|---|---|---|
| CH | 587327 A5 | 4/1977 |
| CN | 101550325 A | 10/2009 |

(Continued)

OTHER PUBLICATIONS

Machine translation of JP-2012149109-A (no date).*

(Continued)

*Primary Examiner* — Michael J Feely
(74) *Attorney, Agent, or Firm* — Alicia M. Passerin

(57) ABSTRACT

Disclosed herein are compositions including (a) a first component comprising (1) an epoxy-adduct that is the reaction product of reactants comprising a first epoxy compound, a polyol, and an anhydride and/or a diacid and (2) a second epoxy compound; (b) rubber particles having a core/shell structure and/or graphenic carbon particles; and (c) a second component that chemically reacts with the first component at ambient or slightly thermal conditions. Also disclosed herein are compositions including (a) an epoxy-capped flexibilizer; (b) a heat-activated latent curing agent; and optionally (c) rubber particles having a core/shell structure and/or graphenic carbon particles; (d) an epoxy/CTBN adduct; and/or (e) an epoxy/dimer acid adduct. The heat-activated latent curing agent may include at least one reaction product of reactants including an epoxy compound and an amine and/or an alkaloid.

28 Claims, 1 Drawing Sheet

(56) References Cited

U.S. PATENT DOCUMENTS

| | | | |
|---|---|---|---|
| 4,668,736 A | 5/1987 | Robins et al. | |
| 4,851,262 A | 7/1989 | McFeaters | |
| 4,990,576 A | 2/1991 | Cuscurida et al. | |
| 5,070,119 A | 12/1991 | Nugent, Jr. et al. | |
| 5,132,374 A * | 7/1992 | Reischmann | C08G 59/12 |
| | | | 528/110 |
| 5,159,039 A | 10/1992 | Kolesinski | |
| 5,175,219 A | 12/1992 | Burba et al. | |
| 5,306,765 A | 4/1994 | Kuriyama et al. | |
| 5,357,008 A | 10/1994 | Tsai et al. | |
| 5,426,169 A | 6/1995 | Starner | |
| 5,468,831 A | 11/1995 | Lenke et al. | |
| 5,486,675 A | 1/1996 | Taylor et al. | |
| 5,717,011 A * | 2/1998 | Griggs | C08G 59/184 |
| | | | 523/414 |
| 5,749,937 A | 5/1998 | Detering et al. | |
| 5,788,738 A | 8/1998 | Pirzada et al. | |
| 5,804,672 A | 9/1998 | Bolte et al. | |
| 5,851,507 A | 12/1998 | Pirzada et al. | |
| 5,935,293 A | 8/1999 | Detering et al. | |
| 5,984,997 A | 11/1999 | Bickmore et al. | |
| 5,989,648 A | 11/1999 | Phillips | |
| 6,099,696 A | 8/2000 | Schwob et al. | |
| 6,107,437 A | 8/2000 | Cawse et al. | |
| 6,228,904 B1 | 5/2001 | Yadav et al. | |
| 6,248,204 B1 | 6/2001 | Schuft | |
| 6,358,375 B1 | 3/2002 | Schwob | |
| RE37,853 E | 9/2002 | Detering et al. | |
| 6,482,899 B2 | 11/2002 | Ohashi et al. | |
| 6,645,341 B1 | 11/2003 | Gordon | |
| 6,652,967 B2 | 11/2003 | Yadav et al. | |
| 6,653,371 B1 | 11/2003 | Burns et al. | |
| 6,669,823 B1 | 12/2003 | Sarkas et al. | |
| 6,689,192 B1 | 2/2004 | Phillips et al. | |
| 6,716,525 B1 | 4/2004 | Yadav et al. | |
| 6,719,821 B2 | 4/2004 | Yadav et al. | |
| 6,786,950 B2 | 9/2004 | Yadav et al. | |
| 6,787,606 B1 | 9/2004 | Chen | |
| 6,821,500 B2 | 11/2004 | Fincke et al. | |
| 6,830,822 B2 | 12/2004 | Yadav | |
| 6,849,109 B2 | 2/2005 | Yadav et al. | |
| 6,884,854 B2 | 4/2005 | Schoenfeld et al. | |
| 6,884,890 B2 | 4/2005 | Kania et al. | |
| 7,071,258 B1 | 7/2006 | Jang et al. | |
| 7,071,263 B2 | 7/2006 | Cheng et al. | |
| 7,425,604 B2 | 9/2008 | Cosman et al. | |
| 7,511,097 B2 | 3/2009 | Frick et al. | |
| 7,547,373 B2 | 6/2009 | Hachikian | |
| 7,596,844 B2 | 10/2009 | Japuntich et al. | |
| 7,635,458 B1 | 12/2009 | Hung et al. | |
| 7,745,528 B2 | 6/2010 | Prud Homme et al. | |
| 7,754,184 B2 | 7/2010 | Mercuri | |
| 7,776,303 B2 | 8/2010 | Hung et al. | |
| 7,785,492 B1 | 8/2010 | Jang et al. | |
| 7,790,285 B2 | 9/2010 | Zhamu et al. | |
| 7,824,741 B2 | 11/2010 | Sandhu | |
| 7,842,271 B2 | 11/2010 | Petrik | |
| 7,923,491 B2 | 4/2011 | Weng et al. | |
| 7,988,941 B2 | 8/2011 | Choi et al. | |
| 7,999,027 B2 | 8/2011 | Zhamu et al. | |
| 8,047,248 B2 | 11/2011 | Prud Homme et al. | |
| 8,075,864 B2 | 12/2011 | Choi et al. | |
| 8,114,375 B2 | 2/2012 | Jang et al. | |
| 8,231,820 B2 | 7/2012 | Dixit et al. | |
| 8,278,398 B2 | 10/2012 | Lutz et al. | |
| 8,362,148 B2 | 1/2013 | Messe et al. | |
| 8,466,238 B2 | 6/2013 | Tamatani et al. | |
| 8,471,065 B2 | 6/2013 | Burton et al. | |
| 8,486,363 B2 | 7/2013 | Hung et al. | |
| 8,486,364 B2 | 7/2013 | Vanier et al. | |
| 8,597,607 B2 | 12/2013 | Lee et al. | |
| 8,632,855 B2 | 1/2014 | Wenxu et al. | |
| 8,637,118 B2 | 1/2014 | Zenasni | |
| 8,652,362 B2 | 2/2014 | Zhamu et al. | |
| 8,673,108 B2 | 3/2014 | Liang et al. | |
| 8,703,090 B2 | 4/2014 | Tour et al. | |
| 8,715,610 B2 | 5/2014 | Wallace et al. | |
| 8,796,361 B2 | 8/2014 | Asay et al. | |
| 8,840,813 B2 | 9/2014 | Aspin et al. | |
| 8,883,114 B2 | 11/2014 | Zhamu et al. | |
| 8,968,695 B2 | 3/2015 | Kwon et al. | |
| 9,469,790 B2 | 10/2016 | Gross et al. | |
| 9,546,092 B2 | 1/2017 | Aksay et al. | |
| 9,562,175 B2 | 2/2017 | Asay et al. | |
| 9,828,534 B2 | 11/2017 | Renkel et al. | |
| 9,932,227 B2 | 4/2018 | Coleman | |
| 10,947,428 B2 | 3/2021 | Desai et al. | |
| 11,629,276 B2 * | 4/2023 | Desai | C09J 163/00 |
| | | | 525/65 |
| 2003/0187155 A1 | 10/2003 | Schile | |
| 2004/0063870 A1 | 4/2004 | Burns et al. | |
| 2004/0072927 A1 | 4/2004 | Hachikian | |
| 2004/0176550 A1 | 9/2004 | McQuaid | |
| 2004/0204551 A1 | 10/2004 | Czaplicki et al. | |
| 2005/0271574 A1 | 12/2005 | Jang et al. | |
| 2006/0093885 A1 | 5/2006 | Krusic et al. | |
| 2006/0121279 A1 | 6/2006 | Petrik | |
| 2006/0216222 A1 | 9/2006 | Jang | |
| 2006/0252891 A1 | 11/2006 | McQuaid | |
| 2007/0045116 A1 | 3/2007 | Hung et al. | |
| 2007/0065703 A1 | 3/2007 | Abd Elhamid et al. | |
| 2007/0191556 A1 | 8/2007 | Eger | |
| 2008/0029214 A1 | 2/2008 | Hable et al. | |
| 2008/0060742 A1 | 3/2008 | Sheasley et al. | |
| 2008/0103340 A1 | 5/2008 | Binder et al. | |
| 2008/0188609 A1 * | 8/2008 | Agarwal | C09J 163/00 |
| | | | 524/500 |
| 2008/0206124 A1 | 8/2008 | Jang et al. | |
| 2008/0220282 A1 | 9/2008 | Jang et al. | |
| 2008/0251202 A1 | 10/2008 | Eagle et al. | |
| 2008/0254214 A1 | 10/2008 | Kassa et al. | |
| 2008/0308212 A1 | 12/2008 | Sheasley et al. | |
| 2009/0022649 A1 | 1/2009 | Zhamu et al. | |
| 2009/0048370 A1 | 2/2009 | Lutz et al. | |
| 2009/0068471 A1 | 3/2009 | Choi et al. | |
| 2009/0075035 A1 | 3/2009 | O'Brien et al. | |
| 2009/0110627 A1 | 4/2009 | Choi et al. | |
| 2009/0169467 A1 | 7/2009 | Zhamu et al. | |
| 2009/0294057 A1 | 12/2009 | Liang et al. | |
| 2009/0308534 A1 | 12/2009 | Malone | |
| 2010/0028651 A1 | 2/2010 | Golden et al. | |
| 2010/0036023 A1 | 2/2010 | Weng et al. | |
| 2010/0047154 A1 | 2/2010 | Lee et al. | |
| 2010/0055017 A1 | 3/2010 | Vanier et al. | |
| 2010/0055025 A1 | 3/2010 | Jang et al. | |
| 2010/0072430 A1 | 3/2010 | Gergely et al. | |
| 2010/0096597 A1 | 4/2010 | Prud Homme et al. | |
| 2010/0104832 A1 | 4/2010 | Messe et al. | |
| 2010/0105834 A1 | 4/2010 | Tour et al. | |
| 2010/0126660 A1 | 5/2010 | O'Hara | |
| 2010/0130655 A1 | 5/2010 | Agarwal et al. | |
| 2010/0247801 A1 | 9/2010 | Zenasni | |
| 2010/0255219 A1 | 10/2010 | Wenxu et al. | |
| 2010/0272908 A1 | 10/2010 | Sturgill et al. | |
| 2010/0280167 A1 | 11/2010 | Frick et al. | |
| 2010/0280191 A1 | 11/2010 | Dixit et al. | |
| 2010/0301212 A1 | 12/2010 | Dato et al. | |
| 2010/0303706 A1 | 12/2010 | Wallace et al. | |
| 2010/0314788 A1 | 12/2010 | Hung et al. | |
| 2010/0323113 A1 | 12/2010 | Ramappa et al. | |
| 2011/0017955 A1 | 1/2011 | Zhamu et al. | |
| 2011/0039109 A1 * | 2/2011 | Frick | C08G 59/686 |
| | | | 548/321.1 |
| 2011/0046289 A1 | 2/2011 | Zhamu et al. | |
| 2011/0058948 A1 * | 3/2011 | Jacob | C08G 63/10 |
| | | | 416/241 A |
| 2011/0070426 A1 | 3/2011 | Vanier et al. | |
| 2011/0076391 A1 | 3/2011 | Gross et al. | |
| 2012/0095133 A1 | 4/2012 | Vyakaranam et al. | |
| 2012/0114551 A1 | 5/2012 | Coleman | |
| 2012/0128499 A1 | 5/2012 | Desai et al. | |
| 2012/0129980 A1 * | 5/2012 | Desai | C08L 63/00 |
| | | | 977/734 |
| 2012/0211160 A1 | 8/2012 | Asay et al. | |

(56) References Cited

U.S. PATENT DOCUMENTS

| | | | |
|---|---|---|---|
| 2012/0237749 | A1 | 9/2012 | Aksay et al. |
| 2012/0256138 | A1 | 10/2012 | Suh et al. |
| 2013/0084236 | A1 | 4/2013 | Hung et al. |
| 2013/0084237 | A1 | 4/2013 | Vanier et al. |
| 2013/0210079 | A1 | 8/2013 | Stanojevic et al. |
| 2014/0037966 | A1 | 2/2014 | Renkel et al. |
| 2014/0150970 | A1* | 6/2014 | Desai ............ C09J 163/00 156/320 |
| 2016/0083633 | A1* | 3/2016 | Desai ............ C08G 59/5006 525/65 |
| 2021/0198538 | A1* | 7/2021 | Desai ............ C08G 59/5006 |
| 2022/0204822 | A1* | 6/2022 | Desai ............ C09J 5/06 |
| 2022/0204823 | A1 | 6/2022 | Desai et al. |

FOREIGN PATENT DOCUMENTS

| | | |
|---|---|---|
| CN | 102433098 B | 5/2012 |
| EP | 0364958 A3 | 12/1991 |
| GB | 1378519 A | 12/1974 |
| GB | 1545108 A | 5/1979 |
| JP | 58-013623 | 1/1983 |
| JP | 59068990 A | 4/1984 |
| JP | S6096617 A | 5/1985 |
| JP | S61268721 A2 | 11/1986 |
| JP | H07309929 A2 | 11/1995 |
| JP | H08269115 A2 | 10/1996 |
| JP | H09235354 A2 | 9/1997 |
| JP | H111635 A2 | 1/1999 |
| JP | 2000-336252 A2 | 12/2000 |
| JP | 2001000915 A * | 1/2001 |
| JP | 2001-072742 A2 | 3/2001 |
| JP | 2001-072744 A2 | 3/2001 |
| JP | 2002-060720 A2 | 2/2002 |
| JP | 2003-026772 A2 | 1/2003 |
| JP | 2003-026982 A2 | 1/2003 |
| JP | 2003-055638 A2 | 2/2003 |
| JP | 2003-001148 A2 | 10/2003 |
| JP | 2004-238434 A2 | 8/2004 |
| JP | 2005-060520 A2 | 3/2005 |
| JP | 2006-008730 A2 | 1/2006 |
| JP | 2008-201884 A2 | 9/2008 |
| JP | 2012-131936 A2 | 7/2012 |
| JP | 2012149109 A * | 8/2012 |
| JP | 2013-082836 A2 | 5/2013 |
| KR | 20040061909 A | 7/2004 |
| KR | 100964561 B1 | 6/2010 |
| RU | 2162480 C2 | 1/2001 |
| RU | 2346090 C2 | 2/2009 |
| RU | 2365608 C2 | 8/2009 |
| RU | 2496915 C1 | 10/2013 |
| SU | 176393 | 12/1965 |
| WO | 1998001495 A1 | 1/1998 |
| WO | 2002088214 A1 | 11/2002 |
| WO | 2003018703 A1 | 3/2003 |
| WO | 2008112952 A1 | 9/2008 |
| WO | 2009065914 A1 | 5/2009 |
| WO | 2009123771 A2 | 10/2009 |
| WO | 2010059505 A1 | 5/2010 |
| WO | 2012081992 A2 | 6/2012 |
| WO | 2012139974 A2 | 10/2012 |
| WO | 2013086277 A2 | 6/2013 |

OTHER PUBLICATIONS

Machine translation of JP-2001000915-A (no date).*
Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997.
Bobylev, "Epoxy Hardeners", Kompozitny Mir, No. 4, 2006 (7), pp. 20-24.
Cassagneau et al., "Preparation of Layer-by-Layer Self-Assembly of Silver Nanoparticles Capped by Graphite Oxide Nanosheets", J. Phys. Chem. B 1999, 103, 1789-1793.
Chan et al., "Survey of Recent Methane Pyrolysis Literature", Industrial and Engineering Chemistry, vol. 62, No. 10, Oct. 1970.
Coraux, "Growth of Graphene on Ir(111)", New Journal of Physics, Nov. 2009, 023006, pp. 1-22.
Dato et al., "Substrate-Free Gas-Phase Synthesis of Graphene Sheets", Nano Letters, vol. 8, No. 7, 2008, pp. 2012-2016.
Dresselhaus et al., "Science of Fullerenes and Carbon Nanotubes", Academic Press, Inc., 1996, pp. 60-79.
Du et al., "Facile Synthesis of Highly Conductive Polyaniline/ Graphite Nanocomposites", European Polymer Journal 40, 2000, pp. 1489-1493.
Fincke et al., "Plasma Pyrolysis of Methane to Hydrogen and Carbon Black", Industrial and Engineering Chemistry Research, vol. 41, No. 6, 2002, pp. 1425-1435.
Fitzer et al., "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.
Gannon, "Acetylene from Hydrocarbons", Kirk-Othmer Encyclopedia of Chemical Technology, 2003, pp. 1-28.
Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.
Gonzalez-Aguilar et al., "Carbon Nanstructures Production by Gas-Phase Plasma Processes at Atmospheric Pressure", J. Phys. D, Appl. Phys., vol. 40, No. 8, 2007, pp. 2361-2374.
Holmen et al., "High-Temperature Pyrolysis of Hydrocarbons. 1. Methane to Acetylene", The Norwegian Institute of Technology, Uiversity of Trondheim, Ind. Eng. Chem., Process Des. Dev., vol. 15, No. 3, 1976.
Kim et al., "Continuous Synthesis of Nanostructured Sheetlike Carbons by Thermal Plasma Decomposition of Methane", IEEE Transactions on Plasma Science, vol. 35, No. 2, Apr. 2007.
Kim et al., "Fabrication of Graphene Flakes Composed of Multi-Layer Graphene Sheets using a Thermal Plasma Jet System", Nanotechnology 21, Jan. 29, 2010.
Kostic et al., "Thermodynamic Consideration of B—O—C—H System for Boron Carbide (B4C) Powder Synthesis in Thermal Plasma", Progress in Plasma Processing of Materials, 1997, pp. 889-898.
Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997.
Malesevic et al., "Synthesis of Few-Layer Graphene via Microwave Plasma-Enhanced Chemical Vapour Deposition", Nanotechnology 2008, vol. 19, No. 30, 305604 (6 pps).
McWilliams, "Graphene: Technologies, Applications, and Markets", BCC Research Report, Feb. 2011.
Nandamuri et al., "Chemical Vapor Deposition of Graphene Films", Nanotechnology 21, 2010, 145604 (4 pp.).
Pham et al., "Epoxy Resins", Encyclopedia of Polymer Science and Technology, Jan. 2004, vol. 9, pp. 678-804.
Pristavita et al., "Carbon Blacks Produced by Thermal Plasma: the Influence of the Reactor Geometry on the Product Morphology", Plasma Chem. Plasma Process, 30, 2010, pp. 267-279.
Pristavita et al., "Carbon Nano-Flakes Produced by an Inductively Coupled Thermal Plasma System for Catalyst Applications", Plasma Chem. Plasma Process, 31, 2011, pp. 393-403.
Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.
Rafiee et al., "Enhanced Mechanical Properties of Nanocomposites at Low Graphene Content", ACSNANO, vol. 3, No. 12, 2009.
Ratna et al., "Shock-Resistance Ambient Temperature Curing Epoxy Adhesive", J. Adhesion Sci. Technol., 2003, vol. 17, No. 5, pp. 623-632.
Skinner, "Prolysis of Methane and the C2 Hydrocarbons", Monsanto Chemical Co., Research and Engineering Division, Dayton 7, Ohio, pp. 59-68.

(56) References Cited

OTHER PUBLICATIONS

Song et al., "Properties of Styrene-Butadiene Rubber Nanocomposites Reinforced with Carbon Black, Carbon Graphene, Graphite", Kor. J. Mater. Res. 2010 vol. 20, No. 2, pp. 104-110.
Subrahmanyam et al., "Simple Method of Preparing Graphene Flakes by an Arc-Discharge Method", The Journal of Physical Chemistry C, vol. 113, No. 11, 2009, pp. 4257-4259.
Tang et al., Processible Nanostructured Materials with Electrical Conductivity and Magnetic Susceptibility: Preparation and Properties of Maghemite/Polyaniline Nanocomposite Films, Chem. Mater., Nov. 1999, 1581-1589.
www.strem.com/uploads/resources/documents/graphene_nanoplatelets, pdf, Apr. 2013.
Zhong et al., "Catalytic Growth of Carbon Nanoballs With and Without Cobalt Encapsulation", Cemical Physics Letters 330, 2000, pp. 41-47.
E.M. Petrie, Epoxy Adhesive Formulations, McGraw-Hill 2006, pp. 18-25; 85-110; 155-183; 378-381.
J.V. Koleske, Paint and coating testing manual, 14th edition, ASTM manual series 1995, pp. 74-78.
Three Bond Technical News—Curing Agents for Epoxy Resins, Dec. 20, 1990, pp. 1-10.
G.T. Murray, Handbook Of Materials Selection For Engineering Applications, Marcel Dekker, 1997, pp. 301-332.

\* cited by examiner

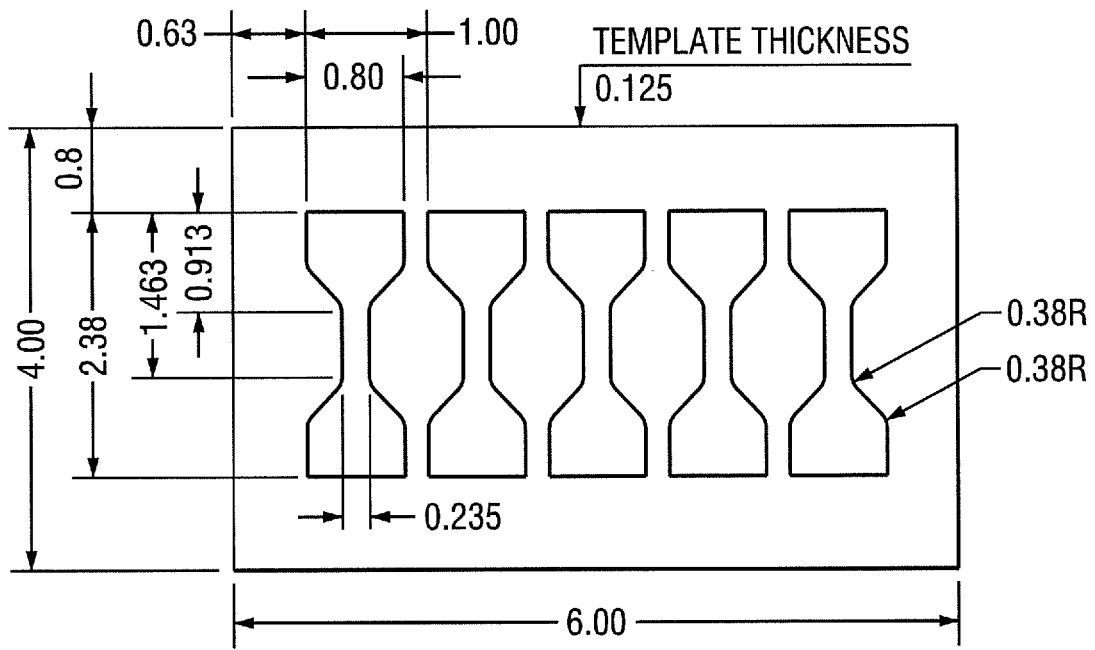

STRUCTURAL ADHESIVE COMPOSITIONS

CROSS-REFERENCE TO RELATED APPLICATIONS

This application is a continuation of U.S. patent application Ser. No. 17/198,504, filed Mar. 11, 2021, which is a divisional of U.S. patent application Ser. No. 14/961,513, filed Dec. 7, 2015, now U.S. Pat. No. 10,947,428, issued Feb. 24, 2021, which is a continuation of Ser. No. 13/918,021, filed Jun. 14, 2013, now abandoned, which is a continuation-in-part of U.S. patent application Ser. No. 13/315,518, filed Dec. 9, 2011, now abandoned, which is a continuation-in-part of U.S. patent application Ser. No. 12/949,878, filed Nov. 19, 2010, now abandoned.

FIELD OF THE INVENTION

The present invention relates to structural adhesive compositions and more particularly to 1K and 2K structural adhesive compositions.

BACKGROUND INFORMATION

Structural adhesives are utilized in a wide variety of applications to bond together two or more substrate materials. For example, structural adhesives may be used for binding together wind turbine blades or binding together automotive structural components.

The present invention is directed towards one-component (1K) and two-component (2K) adhesive compositions that provide sufficient bond strength, are easy to apply, and, where applicable, have sufficiently long pot lives for use in bonding together substrate materials.

SUMMARY OF THE INVENTION

In an embodiment, disclosed is a composition comprising (a) an epoxy-capped flexibilizer; and (b) a heat-activated latent curing agent comprising a reaction product of reactants comprising (i) an epoxy compound, and (ii) an amine and/or an alkaloid.

Also disclosed is method of adhering articles comprising (a) applying the composition to at least one of the articles; and (b) heating the composition at a temperature of less than 140° C. for a time of less than 15 minutes to cure the composition and thereby adhering the articles together.

BRIEF DESCRIPTION OF FIGURE

FIG. 1 is a perspective view of a Teflon template assembly for evaluating tensile properties of structural adhesives according to an exemplary embodiment of the present invention.

DETAILED DESCRIPTION

For purposes of the following detailed description, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In this application and the appended claims, the articles "a," "an," and "the" include plural referents unless expressly and unequivocally limited to one referent. For examples, "a" reaction product, "an" epoxy compound, "an" amine, and "an" alkaloid mean one or more reaction products, epoxy compounds, amines, and alkaloids, respectively.

As noted above, in general, the present invention discloses 1K ("One-Component) and 2K ("Two-Component") structural adhesive compositions that are used to bond together two substrate materials for a wide variety of potential applications in which the bond between the substrate materials provides particular mechanical properties related to elongation, tensile strength, lap shear strength, T-peel strength, modulus, or impact peel strength. The structural adhesive is applied to either one or both of the materials being bonded. The pieces are aligned, and pressure and spacers may be added to control bond thickness. For 2K adhesives, the curing begins upon the mixing together of the components at ambient or slightly thermal temperatures. By contrast for 1K adhesives, the adhesive is cured using an external source such as an oven (or other thermal means) or through the use of actinic radiation (UV light, etc.).

Suitable substrate materials that may be bonded by the structural adhesive compositions include, but are not limited to, materials such as, metals or metal alloys, natural materials such as wood, polymeric materials such as hard plastics, or composite materials. The structural adhesives of the present invention are particularly suitable for use in various automotive applications and for use in wind turbine technology.

As noted above, the structural adhesive compositions of the present invention are suitable for use in bonding the two half shells of wind turbine blades. In this application, for a 2K adhesive, the mixed adhesive composition is applied along the edges of one or both of the half shells of the wind turbine blades. The half shells are then pressed together and the 2K adhesive is allowed to cure for a number of hours at ambient or slightly thermal conditions. A thermal blanket (at about 70° C.) may be applied to the half shells to aid in the curing process. By contrast, for 1K adhesives, as opposed to a system in which the components substantially cure upon mixing, an oven or actinic radiation source is used to complete the curing process.

The half shells, or other components of wind turbine blades, may be formed from metals such as aluminum, metal alloys such as steel, woods such balsa wood, polymeric materials such as hard plastics, or composite materials such as fiber reinforced plastics. In one embodiment, the half shells are formed from fiberglass composites or carbon fiber composites.

The 2K structural adhesives of the present invention are formed from two chemical components, namely, a first component and a second component which are mixed just prior to application. The first component (i.e., an epoxy component), in certain embodiments, comprises an epoxy-adduct and another epoxy compound, or second epoxy compound. The second component, in certain embodiments, comprises a curing component that reacts with the first component to form a bond that provides the substrates to which it is applied with desirable bonding characteristics. In certain embodiments, the curing component is an amine compound, although other curing components such as sulfide curing components may alternatively be utilized.

The equivalent ratio of amine to epoxy in the adhesive composition may vary from about 0.5:1 to about 1.5:1, such as from 1.0:1 to 1.25:1. In certain embodiments, the equivalent ratio of amine to epoxy is slightly above 1:1. As described herein, the equivalents of epoxy used in calculating the equivalent ratio of epoxy are based on the epoxy equivalent weight of the first component, and the equivalents of amine used in calculating the equivalent ratio of amine are based on the amine hydrogen equivalent weight (AHEW) of the second component.

In one embodiment, the epoxy-adduct is formed as the reaction product of reactants comprising a first epoxy compound, a polyol, and an anhydride.

In another embodiment, the epoxy-adduct is formed as the reaction product of reactants comprising a first epoxy compound, a polyol, and a diacid.

In still another embodiment, the epoxy-adduct is formed as the reaction product of reactants comprising a first epoxy compound, a polyol, an anhydride, and a diacid.

In these embodiments, the epoxy-adduct comprises from 3 to 50 weight percent such as from 3 to 25 weight percent of the first component, while the second epoxy compound comprises from 50 to 97 weight percent such as from 75 to 97 weight percent of the first component.

Useful first epoxy compounds that can be used to form the epoxy-adduct include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleiimide.

Useful polyols that may be used to form the epoxy-adduct include diols, triols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized to form the epoxy-adduct are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3', 4,4'-benzopherone tetracarboxylic dianhydride (BTDA); and 4,4'-diphthalic (hexamfluoroisopropylidene) anhydride (6FDA). Useful diacid compounds to functionalize the polyol with acid groups include phthalic acid and its derivates (e.g., methyl phthalic acid), hexahydrophthalic acid and its derivatives (e.g., methyl hexahydrophthalic acid), maleic acid, succinic acid, adipic acid, etc. Any diacid and anhydride can be used; however, anhydrides are preferred.

In one embodiment, the polyol comprises a diol, the anhydride and/or diacid comprises a monoanhydride or a diacid, and the first epoxy compound comprises a diepoxy compound, wherein the mole ratio of diol, monoanhydride (or diacid), and diepoxy compounds in the epoxy-adduct may vary from 0.5:0.8:1.0 to 0.5:1.0:6.0.

In another embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-adduct may vary from 0.5:0.8:0.6 to 0.5:1.0:6.0.

In another embodiment, the second epoxy compound of the first component is a diepoxide compound that has an epoxy equivalent weight of between about 150 and about 1000. Suitable diepoxides having an epoxy equivalent weight of between about 150 and about 1000 include polyglycidyl ethers of Bisphenol A, such as Epon® 828 and 1001 epoxy resins, and Bisphenol F diepoxides, such as Epon® 862, which are commercially available from Hexion Specialty Chemicals, Inc.

In another embodiment, the second epoxy compound of the first component is a diepoxide compound or a higher functional epoxide (collectively, a "polyepoxide"), including polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins.

Still other non-limiting second epoxy compounds include epoxidized Bisphenol A novolacs, epoxidized phenolic novolacs, epoxidized cresylic novolac, and triglycidyl p-aminophenol bismaleiimide.

In another embodiment, the second epoxy compound of the first component comprises an epoxy-dimer acid adduct. The epoxy-dimer acid adduct may be formed as the reaction product of reactants comprising a diepoxide compound (such as a Bisphenol A epoxy compound) and a dimer acid (such as a $C_{36}$ dimer acid).

In another embodiment, the second epoxy compound of the first component comprises a carboxyl-terminated butadiene-acrylonitrile copolymer modified epoxy compound.

Useful amine compounds that may be used include primary amines, secondary amines, tertiary amines, and combinations thereof. Useful amine compounds that can be used include diamines, triamines, tetramines, and higher functional polyamines.

Suitable primary amines include alkyl diamines such as 1,2-diaminoethane, 1,3-diaminopropane, 1,4-diaminobutane, neopentyldiamine, 1,8-diaminooctane, 1,10-diaminodecane, 1,-12-diaminododecane and the like; 1,5-diamino-3-oxapentane, diethylene-triamine, triethylenetetramine, tetraethylenepentamine and the like; cycloaliphatic diamines such as 1,2-bis(aminomethyl)cyclohexane, 1,3-bis(aminomethyl)cyclohexane, 1,4-bis(aminomethyl) cyclohexane, bis (aminomethyl)norbornane and the like; aromatic alkyl diamines such as 1,3-bis(aminomethyl)benzene (m-xylene diamine) and 1,4-bis(aminomethyl)benzene (p-xylenediamine) and their reaction products with epichlorohydrin such as Gaskamine 328 and the like; amine-terminated polyethyleneglycol such as Huntsman Corporation Jeffamine ED series and amine-terminated polypropylene glycol such as Huntsman Corporation Jeffamine D series; and amine-terminated polytetrahydrofurane such as Huntsman Jeffamine EDR series. Primary amines having a functionality higher than 2 include, for example, the Jeffamine T series, available from Huntsman Corporation, which are amine-terminated propoxylated trimethylolpropane or glycerol and aminated propoxylated pentaerythritols.

Still other amines that may be utilized include isophorone diamine, methenediamine, 4,8-diamino-tricyclio[5.2.1.0]decane and N-aminoethylpiperazine.

In certain embodiments, the amine compounds comprise triethylenetetramine (TETA), isophorone diamine, 1,3 bis (aminomethyl)cyclohexane, and polypropylene oxide-based polyetheramines.

In certain embodiments, the polypropylene oxide-based polyetheramines comprise the Jeffamine series products available from Huntsman Chemical of Houston, Texas. Jeffamine series products are polyetheramines characterized by repeating oxypropylene units in their respective structures.

One exemplary class of Jeffamine products, the so-called "Jeffamine D" series products, are amine terminated PPGs (propylene glycols) with the following representative structure (Formula (I)):

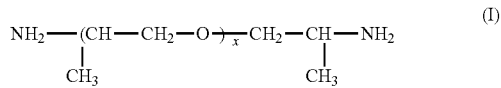

wherein x is 2 to 70.

In certain embodiments, Jeffamine D-230 is one D series product that is used. Jeffamine D-230 has an average molecular weight of about 230 (wherein x is 2.5) and an amine hydrogen equivalent weight (AHEW) of about 60. Other exemplary Jeffamine D series products that may be used according to Formula (I) include those wherein x is from 2.5 to 68.

Another series of polypropylene oxide-based polyetheramines that are used are predominantly tetrafunctional, primary amines with a number average molecular weight from 200 to 2000, and more preferably from 600 to 700, and having an AHEW of greater than 60, and more preferably from 70 to 90. Jeffamine XTJ-616 is one such polypropylene oxide-based polyetheramines that may be utilized in the present invention. Jeffamine XTJ-616 has a number average molecular weight of about 660 and an AHEW of 83.

Higher AHEW amine compounds, such as Jeffamine XTJ-616 and Jeffamine D-230, may be particularly useful in 2K adhesive composition wherein a longer pot life is desired. Conventional tetramines, such as triethylenetetramine, with lower AHEWS have substantially shorter pot lives by comparison. This present invention thus provides a way to manipulate pot life with tetrafunctional amines such as Jeffamine XTJ-616.

In still another embodiment, reinforcement fillers may be added to the adhesive composition as a part of the first component or as a part of the second component, or both.

Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. More preferably, fiber glass ground to 5 microns or wider and to 100-300 microns in length is utilized. Preferably, such reinforcement fillers, if utilized, comprise from 0.5 to 25 weight percent of the adhesive composition.

In still another embodiment, fillers, thixotropes, colorants, tints and other materials may be added to the first or second component of the adhesive composition.

Useful thixotropes that may be used include untreated fumed silica and treated fumed silica, Castor wax, clay, and organo clay. In addition, fibers such as synthetic fibers like Aramid® fiber and Kevlar® fiber, acrylic fibers, and engineered cellulose fiber may also be utilized.

Useful colorants or tints may include red iron pigment, titanium dioxide, calcium carbonate, and phthalocyanine blue.

Useful fillers that may be used in conjunction with thixotropes may include inorganic fillers such as inorganic clay or silica.

In still another embodiment, if needed, a catalyst may be introduced to the adhesive composition, preferably as a part of the second component, to promote the reaction of the epoxide groups of first component and amine groups of the second component.

Useful catalysts that may be introduced to the adhesive composition include Ancamide® products available from Air Products and products marketed as "Accelerators" available from the Huntsman Corporation. One exemplary catalyst is piperazine-base Accelerator 399 (AHEW: 145) available from the Huntsman Corporation. When utilized, such catalysts comprise between 0 and about 10 percent by weight of the total adhesive composition.

In addition, a catalytic effect may be expected from the reaction product of epichlorohydrin from the first component and the amine compound from the second component in an equivalent ratio of 1:1. An example of such a product is Tetrad® and Tetrad®C available from Mitsubishi Gas Chemical Corporation.

In certain embodiments, rubber particles having a core/shell structure may be included in the 2K structural adhesive formulation.

Suitable core-shell rubber particles are comprised of butadiene rubber; however, other synthetic rubbers could be employed, such as styrene-butadiene and acrylonitrile-butadiene and the like. The type of synthetic rubber and the rubber concentration should not be limited as long as the particle size falls under the specified range as illustrated below.

In certain embodiments, the average particle size of the rubber particles may be from about 0.02 to 500 microns (20 nm to 500,000 nm).

In certain embodiments, the core/shell rubber particles are included in an epoxy carrier resin for introduction to the 2K adhesive composition. Suitable finely dispersed core-shell rubber particles in an average particle size ranging from 50 nm to 250 nm are master-batched in epoxy resin such as aromatic epoxides, phenolic novolac epoxy resin, bisphenol A and bisphenol F diepoxide and aliphatic epoxides, which include cyclo-aliphatic epoxides at concentration ranging from 20 to 40 weight percent. Suitable epoxy resins may also include a mixture of epoxy resins.

Exemplary non-limiting commercial core/shell rubber particle products using poly(butadiene) rubber particles having an average particle size of 100 nm that may be utilized in the 2K adhesive composition includes Kane Ace MX 136 (a core-shell poly(butadiene) rubber dispersion (25%) in bisphenol F), Kane Ace MX 153 (a core-shell poly(butadiene) rubber dispersion (33%) in Epon® 828), Kane Ace MX 257 (a core-shell poly(butadiene) rubber dispersion (37%) in bisphenol A), and Kane Ace MX 267 (a core-shell poly(butadiene) rubber dispersion (37%) in bisphenol F), each available from Kaneka Texas Corporation.

Exemplary non-limiting commercial core/shell rubber particle products using styrene-butadiene rubber particles having an average particle size of 100 nm that may be utilized in the 2K adhesive composition includes Kane Ace MX 113 (a core-shell styrene-butadiene rubber dispersion (33%) in low viscosity bisphenol A), Kane Ace MX 125 (a core-shell styrene-butadiene rubber dispersion (25%) in bisphenol A), Kane Ace MX 215 (a core-shell styrene-butadiene rubber dispersion (25%) in DEN-438 phenolic novolac epoxy), and Kane Ace MX 416 (a core-shell styrene-butadiene rubber dispersion (25%) in MY-721 multifunctional epoxy), Kane Ace MX 451 (a core-shell styrene-butadiene rubber dispersion (25%) in MY-0510 multifunctional epoxy), Kane Ace MX 551 (a core-shell styrene-butadiene rubber dispersion (25%) in Synasia 21 Cycloaliphatic Epoxy), Kane Ace MX 715 (a core-shell styrene-butadiene rubber dispersion (25%) in polypropylene glycol (MW 400)), each available from Kaneka Texas Corporation.

In certain embodiments, the amount of core/shell rubber particles included in the 2K adhesive formulation is from 0.1 to 10 weight percent, such as from 0.5 to 5 weight percent, based on the total weight of the 2K coating composition.

In still other embodiments, graphenic carbon particles may be included in the 2K structural adhesive formulation.

Graphene, as defined herein, is an allotrope of carbon, whose structure is one-atom-thick planar sheets of $sp^2$-bonded carbon atoms that are densely packed in a honeycomb crystal lattice. Graphene is stable, chemically inert and mechanically robust under ambient conditions. As used herein, the term "graphenic carbon particles" means carbon particles having structures comprising one or more layers of one-atom-thick planar sheets of $sp^2$-bonded carbon atoms that are densely packed in a honeycomb crystal lattice. As such, the term "graphenic carbon particles" includes one-layer thick sheets (i.e., graphene) and multilayer thick sheets. The average number of stacked layers may be less than 100, for example, less than 50. In certain embodiments, the average number of stacked layers is 30 or less. The graphenic carbon particles may be substantially flat, however, at least a portion of the planar sheets may be substantially curved, curled or buckled. The particles typically do not have a spheroidal or equiaxed morphology.

In certain embodiments, the graphenic carbon particles utilized in the present invention have a thickness, measured in a direction perpendicular to the carbon atom layers, of no more than 10 nanometers, such as no more than 5 nanometers, or, in certain embodiments, no more than 3 or 1 nanometers. In certain embodiments, the graphenic carbon particles may be from 1 atom layer to 10, 20 or 30 atom layers thick, or more. The graphenic carbon particles may be provided in the form of ultrathin flakes, platelets or sheets having relatively high aspect ratios of greater than 3:1, such as greater than 10:1.

In certain embodiments, graphenic carbon particles are roll-milled in an epoxy carrier resin, such as Epon® 828, for introduction to the 2K adhesive composition. In one exemplary embodiment, a master-batch of graphenic carbon particles/added epoxy resin is formed by milling the graphenic carbon particles into the epoxy resin at 10 weight percent or higher concentration. A dispersing method includes typical pigment grind mills such as three-roll mill, Eiger mill, Netsch/Premier mill and the like.

One exemplary graphenic carbon particle material that may be used in the 2K adhesive formulation is XG Sciences Graphene Grade C, which has a surface area of 750 $m^2/g$, an average thickness about 2 nanometers, and an average diameter less than 2 microns.

In certain embodiments, the amount of graphenic carbon particles included in the 2K adhesive formulation is sufficient to provide increased tensile modulus while maintaining a glass transition temperature as compared with formulations not including the graphenic carbon particles.

In certain embodiments, the amount of graphenic carbon particles included in the 2K adhesive formulation is from about 0.5 to 25 weight percent based on the total weight of the 2K coating composition.

As also noted above, in certain embodiments, the 1K structural adhesives of the present invention comprise: (a) an epoxy-capped flexibilizer; and (b) a heat-activated latent curing agent. In certain other embodiments, the 1K structural adhesives may further comprise one or more of the following components: (c) an epoxy/CTBN (carboxy-terminated butadiene acrylonitrile polymer) adduct; (d) an epoxy/ dimer acid adduct; (e) rubber particles having a core/shell structure; and (f) graphenic carbon particles. Each component (a)-(e) is described further below.

In certain embodiments, the (a) epoxy-capped flexibilizer is formed as the reaction product of reactants comprising a first epoxy compound, a polyol, and an anhydride and/or a diacid (i.e., an anhydride, a diacid, or both an anhydride and a diacid may be part of the reaction product).

Useful epoxy compounds that can be used include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleiimide.

Useful polyols that may be used include diols, triols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianyhydrige (PMDA); 3,3', 4,4'-oxydiphthalic dianhydride (ODPA); 3,3', 4,4'-benzopherone tetracarboxylic dianhydride (BTDA); and 4,4'-diphthalic (hexamfluoroisopropylidene) anhydride (6FDA). Useful diacid compounds to functionalize the polyol with acid groups include phthalic acid and its derivates (e.g., methyl phthalic acid), hexahydrophthalic acid and its derivatives (e.g., methyl hexahydrophthalic acid), maleic acid, succinic acid, adipic acid, etc. Any diacid and anhydride can be used; however, anhydrides are preferred.

In one embodiment, the polyol comprises a diol, the anhydride and/or diacid comprises a monoanhydride or a diacid, and the first epoxy compound comprises a diepoxy compound, wherein the mole ratio of diol, monoanhydride (or diacid), and diepoxy compounds in the epoxy-capped flexibilizer may vary from 0.5:0.8:1.0 to 0.5:1.0:6.0.

In another embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-capped flexibilizer may vary from 0.5:0.8:0.6 to 0.5:1.0:6.0.

In certain embodiments, the (a) epoxy-capped flexibilizer comprises the reaction product of reactants comprising an epoxy compound, an anhydride and/or a diacid, and a caprolactone. In certain other embodiments, a diamine and/or a higher functional amine may also be included in the reaction product in addition to the epoxy compound, caprolactone, and the anhydride and/or a diacid.

Suitable epoxy compounds that may be used to form the epoxy-capped flexibilizer include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis (2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

Useful anhydride compounds that may be utilized include hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianyhydrige (PMDA); 3,3', 4,4'-oxydiphthalic dianhydride (ODPA); 3,3', 4,4'-benzopherone tetracarboxylic dianhydride (BTDA); and 4,4'-diphthalic (hexamfluoroisopropylidene) anhydride (6FDA). Useful diacid compounds to functionalize the polyol with acid groups include phthalic acid and its derivates (e.g., methyl phthalic acid), hexahydrophthalic acid and its derivatives (e.g., methyl hexahydrophthalic acid), maleic acid, succinic acid, adipic acid, etc. Any diacid and anhydride can be used; however, anhydrides are preferred.

Useful caprolactones that can be used include caprolactone monomer, methyl, ethyl, and propyl substituted caprolactone monomer, and polyester diols derived from caprolactone monomer. Exemplary polyester diols having a molecular weight from about 400 to 8000 include diols sold under the trade name CAPA®, including CAPA® 2085, available from Perstorp.

Useful diamine or higher functional amine compounds that can be used to form the epoxy-capped flexibilizer include primary amines, secondary amines, tertiary amines, and combinations thereof. Useful amine compounds that can be used include diamines, triamines, tetramines, and higher functional polyamines.

Suitable primary diamines or higher functional amines that may be used include alkyl diamines such as 1,2-diaminoethane, 1,3-diaminopropane, 1,4-diaminobutane, neopentyldiamine, 1,8-diaminooctane, 1,10-diaminodecane, 1,-12-diaminododecane and the like; 1,5-diamino-3-oxapentane, diethylene-triamine, triethylenetetramine, tetraethylenepentamine and the like; cycloaliphatic diamines such as 1,2-bis(aminomethyl)cyclohexane, 1,3-bis(aminomethyl) cyclohexane, 1,4-bis(aminomethyl) cyclohexane, bis(aminomethyl)norbornane and the like; aromatic alkyl diamines such as 1,3-bis(aminomethyl)benzene (m-xylene diamine) and 1,4-bis(aminomethyl)benzene (p-xylenediamine) and their reaction products with epichlorohydrin such as Gaskamine 328 and the like; amine-terminated polyethyleneglycol such as Huntsman Corporation Jeffamine ED series and amine-terminated polypropylene glycol such as Huntsman Corporation Jeffamine D series; and amine-terminated polytetrahydrofurane such as Huntsman Jeffamine EDR series. Primary amines having a functionality higher than 2 include, for example, the Jeffamine T series, available from Huntsman Corporation, which are amine-terminated propoxylated trimethylolpropane or glycerol and aminated propoxylated pentaerythritols.

In certain embodiments, the polypropylene oxide-based polyetheramines comprise the Jeffamine series products available from Huntsman Chemical of Houston, Texas. Jeffamine series products are polyetheramines characterized by repeating oxypropylene units in their respective structures.

One exemplary class of Jeffamine products, the so-called "Jeffamine D" series products, are amine terminated PPGs (propylene glycols) with the following representative structure (Formula (I)):

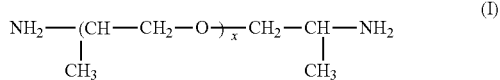

(I)

wherein x is 2 to 70.

In one embodiment, the caprolactone comprises a carprolactone monomer, the anhydride and/or diacid comprises a monoanhydride or a diacid, and the first epoxy compound comprises a diepoxy compound, wherein the mole ratio of caprolactone monomer, monoanhydride (or diacid), and diepoxy compounds in the epoxy-capped flexibilizer may vary from 0.5:0.8:1.0 to 0.5:1.0:6.0.

In one embodiment, the caprolactone comprises a carprolactone monomer, the anhydride and/or diacid comprises a monoanhydride or a diacid, and the first epoxy compound comprises a diepoxy compound, wherein the mole ratio of caprolactone monomer, monoanhydride (or diacid), and diepoxy compounds in the epoxy-capped flexibilizer may vary from 0.5:0.8:0.6 to 0.5:1.0:6.0.

In one embodiment, the caprolactone comprises a carprolactone monomer, the anhydride and/or diacid comprises a monoanhydride or a diacid, the diamine or higher functional amine comprises a diamine, and the first epoxy compound comprises a diepoxy compound, wherein the mole ratio of caprolactone monomer, monoanhydride (or diacid), diamine and diepoxy compounds in the epoxy-capped flexibilizer may vary from 2:1:2:2 to 3:1:3:3.

In certain embodiments, the (a) epoxy-capped flexibilizer comprises the reaction product of reactants comprising an epoxy compound and a primary or secondary polyether amine.

Suitable epoxy compounds that may be used to form the epoxy-capped flexibilizer include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis (2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

Useful primary and secondary polyether amine compounds that can be used to form the epoxy-capped flexibilizer include amine-terminated polyethyleneglycol such as Huntsman Corporation Jeffamine ED series and amine-terminated polypropylene glycol such as Huntsman Corporation Jeffamine D series; and amine-terminated polytetrahydrofurane such as Huntsman Jeffamine EDR series. Primary amines having a functionality higher than 2 include, for example, the Jeffamine T series, available from Huntsman Corporation, which are amine-terminated propoxylated trimethylolpropane or glycerol and aminated propoxylated pentaerythritols.

In one embodiment, the epoxy compound comprises a diepoxide, and the primary or secondary polyether amine comprises a difunctional amine, wherein the mole ratio of diepoxide to difunctional amine varies from 2:0.2 to 2:1.

In certain embodiments, the 1K structural adhesive may include from 2 to 40 weight percent, such as from 10 to 20 weight percent, of (a) the epoxy-capped flexibilizer, based on the total weight of the 1K structural adhesive composition, of any of the forms of described above.

In still other related embodiments, the (a) the epoxy-capped flexibilizer may comprise a mixture of any two or more of the epoxy-capped flexibilizers described above, wherein the total weight percent of the mixture of the two or more of the epoxy-capped flexibilizers comprises from 2 to 40 weight percent, such as from 10 to 20 weight percent, based on the total weight of the 1K structural adhesive composition.

In certain embodiments, the (b) heat-activated latent curing agent that may be used include guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. In addition, catalytically active substituted ureas may also be used. Suitable catalytically-active substituted ureas include p-chlorophenyl-N,N-dimethylurea, 3-phenyl-1,1-dimethylurea (fenuron) or 3,4-dichlorophenyl-N,N-dimethylurea.

In certain other embodiments, the (b) heat-activated latent curing agent also or alternatively comprises dicyandiamide and 3,4-dichlorophenyl-N,N-dimethylurea (also known as Diuron).

In certain embodiments, the 1K structural adhesive may include from 3 to 25 weight percent, such as from 5 to 10 weight percent, of (b) the heat-activated latent curing agent, based on the total weight of the 1K structural adhesive composition.

In certain embodiments, the (b) heat-activated latent curing agent that may be used may comprise a reaction product of reactants comprising (i) an epoxy compound, and (ii) an amine and/or an alkaloid. In certain embodiments, the (b) heat-activated latent curing agent that may be used may comprise a reaction product of reactants comprising (i) an epoxy compound and (ii) an amine. In certain embodiments, the (b) heat-activated latent curing agent may further comprise a reaction product of reactants comprising (i) an epoxy compound and (ii) an alkaloid.

In certain embodiments, the molar ratio of the epoxy compound to the amine in the heat-activated latent curing agent may be between 1:2 to 8:9, such as between 2:3 to 6:7, such as 4:5. In certain embodiments, the molar ratio of the epoxy compound to the alkaloid in the heat-activated latent curing agent may be between 1:1 to 3:1, such as 2:1.

Useful epoxy compounds that may be used to form the reaction product comprising the heat-activated latent curing catalyst include a diepoxide or a higher functional epoxide (collectively, a "polyepoxide"). Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins, and polyepoxides that are partially defunctionalized by carboxylic acids, alcohol, water, phenols, mercaptans or other active hydrogen-containing compounds to give hydroxyl-containing polymers. Still other non-limiting epoxy compounds include epoxidized Bisphenol A novolacs, epoxidized phenolic novolacs, epoxidized cresylic novolac, and triglycidyl p-aminophenol bismaleiimide.

Other suitable epoxy compounds that may be used to form the reaction product comprising the heat-activated latent curing catalyst include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Useful amine compounds that may be used to form the reaction product comprising the heat-activated latent curing catalyst include primary amines, secondary amines, tertiary amines, and combinations thereof. Useful amine compounds that may be used to form the reaction product comprising the heat-activated latent curing catalyst include monoamines, diamines, triamines, tetramines, and higher functional polyamines.

Suitable primary amines that may be used to form the reaction comprising the heat-activated latent curing catalyst include alkyl diamines such as 1,2-diaminoethane, 1,3-diaminopropane, 1,4-diaminobutane, neopentyldiamine, 1,8-diaminooctane, 1,10-diaminodecane, 1,-12-diaminododecane and the like; 1,5-diamino-3-oxapentane, diethylenetriamine, triethylenetetramine, tetraethylenepentamine and the like; cycloaliphatic diamines such as 1,2-bis(aminomethyl)cyclohexane, 1,3-bis(aminomethyl)cyclohexane, 1,4-bis(aminomethyl) cyclohexane, bis(aminomethyl)norbornane and the like; aromatic alkyl diamines such as 1,3-bis (aminomethyl)benzene (m-xylene diamine) and 1,4-bis (aminomethyl)benzene (p-xylenediamine) and their reaction products with epichlorohydrin such as Gaskamine 328 and the like; amine-terminated polyethyleneglycol such as Huntsman Corporation Jeffamine ED series and amine-terminated polypropylene glycol such as Huntsman Corporation Jeffamine D series; and amine-terminated polytetrahydrofurane such as Huntsman Jeffamine EDR series. Primary amines having a functionality higher than 2 include, for example, the Jeffamine T series, available from Huntsman Corporation, which are amine-terminated propoxylated trimethylolpropane or glycerol and aminated propoxylated pentaerythritols.

Still other amines that may be utilized to form the reaction product comprising the heat-activated latent curing catalyst include isophorone diamine, methenediamine, 4,8-diaminotricyclio[5.2.1.0]decane and N-aminoethylpiperazine.

In certain embodiments, the amine compounds that may be used to form the reaction product comprising the heat-activated latent curing catalyst comprise triethylenetetramine (TETA), isophorone diamine, 1,3 bis(aminomethyl) cyclohexane, and polypropylene oxide-based polyetheramines.

In certain embodiments, the polypropylene oxide-based polyetheramines comprise the Jeffamine series products available from Huntsman Chemical of Houston, Texas. Jeffamine series products are polyetheramines characterized by repeating oxypropylene units in their respective structures.

One exemplary class of Jeffamine products, the so-called "Jeffamine D" series products, are amine terminated PPGs (propylene glycols) with the following representative structure (Formula (I)):

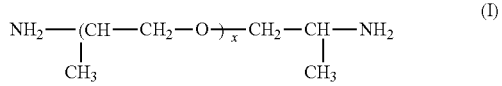

wherein x is 2 to 70.

In certain embodiments, Jeffamine D-230 is one D series product that is used. Jeffamine D-230 has an average molecular weight of about 230 (wherein x is 2.5) and an amine hydrogen equivalent weight (AHEW) of about 60. Other exemplary Jeffamine D series products that may be used according to Formula (I) include those wherein x is from 2.5 to 68.

Another series of polypropylene oxide-based polyetheramines that may be used to form the reaction comprising the heat-activated latent curing catalyst are predominantly tetrafunctional, primary amines with a number average molecular weight from 200 to 2000, and more preferably from 600 to 700, and having an AHEW of greater than 60, and more preferably from 70 to 90. Jeffamine XTJ-616 is one such polypropylene oxide-based polyetheramines that may be utilized in the present invention. Jeffamine XTJ-616 has a number average molecular weight of about 660 and an AHEW of 83.

Useful alkaloid compounds that may be used to form the reaction product comprising the heat-activated latent curing catalyst include azoles, diazoles, triazoles, higher functional azoles, and combinations thereof. Suitable alkaloid compounds include pyrrolidine, tropane, pyrrolizidine, piperidine, quinolizidine, indolizidine, pyridine, isoquinoline, oxazole, isoxazole, thiazole, quinazoline, acridine, quinoline, indole, imidazole, purine, phenethylamine, muscarine, benzylamines, derivatives of these alkaloid compounds, or combinations thereof.

As used herein, the term "cure," when used with respect to the (b) heat-activated latent curing agent comprising a reaction product of reactants comprising (i) an epoxy compound, and (ii) an amine and/or an alkaloid, means a coating composition that, when applied at 1 mm thick to hot dipped galvanized metal with a bond area of 20 mm×10 mm×0.25 mm, and following heating, has a measured lap shear strength of at least 15 MPa when tested at room temperature. In an embodiment, the coating composition comprising the (b) heat activated latent curing agent may be cured at a temperature of less than 140° C., such as between 120° C. and 140° C., such as 130° C. In an embodiment, the coating composition comprising the (b) heat activated-latent curing agent may be cured for less than 20 minutes, such as between 13 and 17 minutes, such as 15 minutes.

As noted above, in certain embodiments, the 1K structural adhesive composition may include (c) an epoxy/CTBN adduct. In certain embodiments, CTBN liquid polymers undergo addition esterification reactions with epoxy resins, allowing them to serve as elastomeric modifiers to enhance impact strength, peel strength, and crack resistance.

Suitable epoxy compounds that may be used to form the epoxy/CTBN adduct include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis (2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

In certain embodiments, at least a portion, often at least 5 percent by weight, of the polyepoxide has been reacted with a carboxy-terminated butadiene acrylonitrile polymer. In certain of these embodiments, the carboxy-terminated butadiene acrylonitrile polymers have an acrylonitrile content of 10 to 26 percent by weight. Suitable CTBN compounds having an acrylonitrile content of 10 to 26 percent by weight that may be used include Hypro 1300X8, Hypro 1300X9, Hypro 1300X13, Hypro 1300X18, and Hypro 1300X31, each available from Emerald Specialty Polymers, LLC of Akron, Ohio.

In certain other embodiments, the polyepoxide may be reacted with a mixture of different carboxy-terminated butadiene acrylonitrile polymers.

In certain embodiments, the functionality of the CTBN utilized is from 1.6 to 2.4, and the epoxy compound is reacted with the CTBN material in a stoichiometric amount to form the epoxy/CTBN adduct.

In certain embodiments, the epoxy/CTBN adduct comprises from about 1 to 20 weight percent, such as from 5 to 10 weight percent, of the total weight of the 1K structural adhesive composition.

As noted above, in certain embodiments, the 1K structural adhesive composition may include (d) an epoxy/dimer acid adduct. In certain embodiments, the epoxy/dimer acid adduct may be formed by reacting an epoxy compound with a dimer acid.

Suitable epoxy compounds that may be used to form the epoxy/dimer acid adduct include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

As defined herein, dimer acids, or dimerized fatty acids, are dicarboxylic acids prepared by dimerizing unsaturated fatty acids obtained from tall oil, usually on clay catalysts. Dimer acids usually predominantly contain a dimer of stearic acid known as C36 dimer acid. A suitable dimer acid for use in forming the epoxy/dimer acid adduct of the present invention may be obtained from Croda, Inc. or from Cognis.

In certain embodiments, the epoxy compounds and dimer acids are reacted in stoichiometric amounts to form the epoxy/dimer acid adduct.

In certain embodiments, the epoxy/dimer acid adduct comprises from about 1 to 15 weight percent, such as from 2 to 7 weight percent, of the total weight of the 1K structural adhesive composition.

As noted above, in certain embodiments, the 1K structural adhesive composition may also include (e) rubber particles having a core/shell structure. Suitable core shell rubber particles for use in the 1K structural adhesives are the same as those described above with respect to the 2K adhesive formulations and therefore not repeated herein.

In certain embodiments, the 1K structural adhesive may include from 0 to 75 weight percent, such as from 5 to 60 weight percent, of (e) the rubber particles having a core/shell structure, based on the total weight of the 1K structural adhesive composition.

As noted above, in certain embodiments, the 1K structural adhesive composition may also include (f) graphenic carbon particles. Suitable graphenic carbon particles for use in the 1K structural adhesives are the same as those described above with respect to the 2K adhesive formulations and therefore not repeated herein.

In certain embodiments, the 1K structural adhesive may include from 0 to 40 weight percent, such as from 0.5 to 25 weight percent, of (f) the graphenic carbon particles, based on the total weight of the 1K structural adhesive composition.

In still other embodiments, the 1K structural adhesive formulation may also include epoxy compounds or resins that are not incorporated into or reacted as a part of any of the components (a)-(f) above, including epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

In still another embodiment, reinforcement fillers may be added to the adhesive composition. Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. More preferably, fiber glass ground to 5 microns or wider and to 100-300 microns in length is utilized. Preferably, such reinforcement fillers, if utilized, comprise from 0.5 to 25 weight percent of the 1 k adhesive composition.

In still another embodiment, fillers, thixotropes, colorants, tints and other materials may be added to the 1K adhesive composition.

Useful thixotropes that may be used include untreated fumed silica and treated fumed silica, Castor wax, clay, and organo clay. In addition, fibers such as synthetic fibers like Aramid® fiber and Kevlar® fiber, acrylic fibers, and engineered cellulose fiber may also be utilized.

Useful colorants or tints may include red iron pigment, titanium dioxide, calcium carbonate, and phthalocyanine blue.

Useful fillers that may be used in conjunction with thixotropes may include inorganic fillers such as inorganic clay or silica.

Exemplary other materials that may be utilized include, for example, calcium oxide and carbon black.

Illustrating the invention are the following examples that are not to be considered as limiting the invention to their details. All parts and percentages in the examples, as well as throughout the specification, are by weight unless otherwise indicated.

EXAMPLES

Example 1-2K Adhesive Compositions

Part A—Synthesis of Polyether—Polyester Modified Epoxy Resin

To a four-neck flask fitted with condenser, thermometer, stirrer, and nitrogen inlet, add 304.6 grams of hexahydrophthalic anhydride and 248.1 grams of Terathane® 250. Heat the mixture to 100° C. with stirring under nitrogen atmosphere and hold the reaction mixture at 100° C. for 155 minutes. Cool the reaction mixture to 60° C. and then add 1431.6 grams of Epon® 828 and 15.0 grams of triphenyl phosphine. Heat the reaction mixture to 110° C. and hold at this temperature for 150 minutes. Then, cool the mixture to room temperature. The resultant compound has 99.89% solids, an acid value of 0.2, and an epoxy equivalent weight of 380.7. The resultant compound is the epoxy adduct of the first component of the 2K adhesive material listed in Part 1 of Table 1 below.

Part B—Evaluation of 2K Adhesives with and without Epoxy-Adduct; Evaluation of 2K Adhesives with Varying Amine Hydroxyl Equivalent Weights The following examples compare 2K adhesive compositions without an epoxy-adduct (Example 1) to those with an epoxy-adduct (Examples 2-4). The formulations for the first component (Part 1) and second component (Part 2) of the 2K adhesive compositions are shown in Table 1.

1 minute in Part 2 and then the rest of the ingredients were added and mixed for one minute in Part 2. During the mixing process, the mixture was examined with a spatula and given additional mix time, if necessary, to ensure uniformity. The final step of the mixing process involved mixing the mixture with an air motor prop in a vacuum sealed apparatus for 5 minutes at 28 to 30 inches of vacuum pressure. After the final mixing step with the air motor prop, the adhesive compositions were ready for testing.

Part 1 and Part 2 were targeted for 2:1 volume mix ratio. In some instances, appropriate weight ratios were determined to test properties. Amine to epoxy ratio were kept slightly over one for all the examples to ensure complete reaction of epoxy as shown in the result section of Table 1. Appropriate weight ratio of Part 1 and Part 2 were weighed and mixed in the DAC mixer for one minute at 2350 RPM

TABLE 1

| Formula | Ex. 1 | Ex. 2 | Ex. 3 | Ex. 4 |
|---|---|---|---|---|
| Part 1 | | | | |
| Epon ® 828[1] | 46 | 41 | 40.5 | 43 |
| Epon ® 828/Terathane 250/HHPA[2] | — | 12 | 12 | 6 |
| Microglass 9132[3] | 6 | 2 | — | 4 |
| Hakuenka CCR-S[4] | — | — | — | 1.5 |
| Wacker HDK H17 [5] | 3.5 | 3.25 | 3.5 | 3 |
| Tint AYD ST 8454[6] | 0.02 | 0.02 | 0.02 | 0.01 |
| Part 2 | | | | |
| Jeffamine D-230[7] | 11.5 | 12 | 12 | 11.6 |
| Jeffamine XTJ-616[8] | 5 | 5 | — | 2.5 |
| Triethylenetetramine (TETA)[9] | — | — | 2.3 | — |
| IPDA[10] | — | — | — | 1.35 |
| Accelerator 399[11] | 2.2 | 2.2 | 2.2 | 0.5 |
| Microglass 9132[3] | 1.5 | 6 | 8 | 4 |
| Hakuenka CCR-S[4] | 1 | 1.5 | 6 | 2 |
| Wacker HDK H17 [5] | 2.75 | 2.5 | 2 | 2.5 |
| Tint AYD PC 9298[12] | 0.01 | 0.01 | 0.01 | 0.01 |
| Results | | | | |
| Amine/Epoxy Ratio | 1.030 | 1.032 | 1.033 | 1.036 |
| Lap Shear Strength (MPa) | 24.5 | 26.7 | 25.5 | 31.4 |
| Elongation (%) | 3.5 | 3.4 | 3.7 | 3.5 |
| Tensile Strength (MPa) | 65 | 61 | 68 | 55 |
| Modulus (MPa) | 3185 | 3127 | 3473 | 2931 |
| (data range) | (3025-3300) | (2974-3274) | (3233-3671) | (2733-3218) |
| Fatigue Test (8 MPa Stress) | | | | |
| cycles to fail | 173532 | >432000 | 337062 | 329371 |
| cycles to fail | 219062 | >432000 | >432000 | >432000 |
| Average | 196297 | >432000 | 337062 | 329371 |

[1]Bisphenol A/Epichlorohydrin resin available from Huntsman Advance Materials
[2]Synthesis example from Example 1, Part A
[3]Silane treated chopped fiberglass from Fibertec
[4]Precipitated Calcium Carbonate available from Shiraishi Kogyo Kaisha
[5] Hydrophobic Fumed Silica available from Wacker Chemie AG
[6]ORG Yellow Tint Base available from Elementis Specialties
[7]Polyoxyalkyleneamine available from Huntsman
[8]Polyoxyalkyleneamine available from Huntsman
[9]Triethylenetetramine available from Dow Chemical Co.
[10]Isophorone Diamine available from Evonik AG
[11]Mix of Alkanolamine/piperazine derivative available from Huntsman
[12]Phthlalo Blue Pigment Dispersion available from Elementis Specialties Test Methods In each of the Examples, the raw materials listed in Table 1 were mixed using a Speedmixer DAC 600 FVZ (commercially available from FlackTek, Inc.). Ingredients 1 and 2 were mixed for 2 minutes at 2350 revolutions per minute ("RPM") in Part 1. Then, items 3 to 6 were added and mixed for one minute at 2350 RPM. Items 7 to 11 were mixed for and immediately mixed under vacuum as described in previous paragraph. The mixed sample was then subjected to the following tests:

Lap-Shear Testing: 25 mm×100 mm Coupons were cut from 6-ply unidirectional glass/epoxy laminates supplied by MFG, Inc. with peel ply removed. Coupons were scribed at one end at 12.5 mm. Adhesive was applied evenly on one of the coupons within the scribed area for each bond assembly. Uniformity of bond thickness is insured by adding 1.0±0.5 mm glass spacer beads. Spacer beads were sprinkled evenly over the material, covering no more than 5% of the total bond area. The other test coupon was placed on the bond area and spring-loaded clips, such as Binder Clips from Office Max or Mini Spring Clamp from Home Depot, were attached, one to each side of the bond, to hold the assembly together during bake. Care was given to align parallel edges. Excess adhesive that was squeezed out was removed with a spatula before baking. Bond assemblies were given an open time of 15 to 30 minutes and baked at 70 degrees Celsius for six hours, and after cooling, remaining excess was sanded. Bonds were conditioned at room temperature for at least 24 hours. Bonds were inserted in wedge action grips and pulled apart at a rate of 10 mm per minute using an Instron model 5567 in tensile mode. Lap Shear strength was calculated by Instron's Blue Hill software package.

Free film mechanical properties: The same adhesive mix was used to prepare void free dog-bone shaped free film by skiving material with care to avoid any air pockets. FIG. 1 is an example of a Teflon template to make five dog-bone cavities. The template was glued to a solid Teflon piece with double-side adhesive tape prior to skiving adhesive in the cavity. This assembly was given an open airtime of 15 to 30 minutes and then baked at 70° C. for 6 hours. It was conditioned at least 24 hours and then the dog-bone shaped free film was popped out of the template. Actual thickness and width were recorded into Instron 5567 software. Then, the dog-bone was inserted into the wedge action grip and pulled at a rate of 50 mm per minute. Percent elongation, tensile strength, and modulus were determined with Instron's Blue Hill software package. Alternatively, ISO 527-1 & 2 method and die configuration was used wherever indicated in the tables to prepare the dog-bone (dumb-bell) shaped free film.

Load controlled lap-shear fatigue test was done using the same laminate and coupon construction as described in the previous paragraph. An automated system utilizing Instron, servo-controlled, hydraulically actuated, closed loop test equipment, and a personal computer with software designed by Westmoreland Mechanical Testing and Research, Inc. provided the means for machine control. Each specimen was inserted in wedge action grips along with frictionally retained shims with thickness equal to that of the fiberglass substrates and bond-line to ensure axial loading. The test was run at room temperature with an R-ratio of 0.1 at 5 Hz sinusoidal waveform and load application of 8 MPa. Testing was continued until 432,000 cycles or failure.

Part C—Evaluation of Pot Life with 2K Adhesives Having Varying Amine Hydroxy Equivalent Weights Table 2 shows pot life comparison between propylene oxide-based polyether tetramine, Jeffamine XTJ-616, and ethylene oxide-based triethylenetetramine in similar formulas, wherein the amine/epoxy ratio was maintained between 1.03 and 1.05. The formulations and results are shown in Table 2:

TABLE 2

Pot life Comparison

| Formula | Ex. 5 | Ex. 6 |
|---|---|---|
| Part 1 | | |
| Epon ® 828[1] | 44 | 43.5 |
| Epon ® 828/Terathane 250/HHPA[2] | 6 | 6 |
| Microglass 9132[3] | 2 | 1 |

TABLE 2-continued

Pot life Comparison

| Formula | Ex. 5 | Ex. 6 |
|---|---|---|
| Wacker HDK H17[5] | 3.5 | 3 |
| Tint AYD ST 8454[6] | 0.01 | 0.01 |
| Part 2 | | |
| Jeffamine D-230[7] | 12 | 12 |
| Jeffamine XTJ-616[8] | 5 | |
| Triethylenetetramine (TETA)[9] | — | 2.3 |
| Accelerator 399[11] | 0.5 | 0.5 |
| Microglass 9132[3] | 5 | 7 |
| Hakuenka CCR-S[4] | 3 | 6.64 |
| Wacker HDK H17[5] | 2.25 | 2.36 |
| Tint AYD PC 9298[12] | 0.01 | 0.01 |
| Amine/Epoxy Ratio (2:1 volume mix) | 1.033 | 1.0464 |
| Pot Life, minutes | 174 | 63 |
| Peak Temperature (° C.) | 73 | 150 |
| Minutes to reach Peak | 239 | 83 |

In this experiment, both formulas (Examples 5 and 6) utilized the same amount of Accelerator 399 which also has significant influence on pot-life. If Accelerator 399 was absent, the pot life was found to be significantly higher.

Pot-life was defined as the interval from time when Part 1 (the epoxy component) and Part 2 (the amine component) were mixed to the time when internal temperature of adhesive reaches 50° C. in 415 ml. of mass. Part 1 and Part 2 were mixed in a 2 to 1 volume ratio using a static mixer; P C COX pneumatic dual applicator dispensed mixed adhesive into a paper cup marked with 415 ml. level line and initial time was noted. The cup was immediately placed in 25° C. water bath with a thermo-couple inserted to the center location of the mixed adhesive mass. PC based data logger was employed to record temperature every minute to determine Pot-life time taken to reach 50° C., the peak temperature, and the time to reach the peak temperature.

Part D—Evaluation of 2K Adhesives With and Without Reinforcement Filler

In this experiment, the effect of the addition of fiberglass as a reinforcement filler was compared in a sample formulation as described in Table 3.

Examples 7 and 8 in Table 3 are a comparative study without and with Microglass 9132 (fiberglass strands with an average of 220-micron length). Results indicate significant increase in modulus when Microglass 9132 is present.

TABLE 3

Effects of Fiberglass on Modulus Properties

| Formula | Ex. 7 | Ex. 8 |
|---|---|---|
| Part 1 | | |
| Epon ® 828[1] | 41 | 41 |
| Epon ® 828/Terathane 250/HHPA[2] | 12 | 12 |
| Microglass 9132[3] | — | 6 |
| Wacker HDK H17[5] | 3.25 | 2 |
| Tint AYD ST 8454[6] | 0.02 | 0.02 |
| Part 2 | | |
| Jeffamine D-230[7] | 12 | 12 |
| Jeffamine XTJ-616[8] | 5 | 5 |
| Accelerator 399[11] | 2.2 | 2.2 |
| Microglass 9132[3] | — | 6 |
| Hakuenka CCR-S[4] | 1.5 | 1.5 |
| Wacker HDK H17[5] | 2.5 | 2.5 |

TABLE 3-continued

Effects of Fiberglass on Modulus Properties

| Formula | Ex. 7 | Ex. 8 |
|---|---|---|
| Tint AYD PC 9298[12] | 0.01 | 0.01 |
| Amine/Epoxy Ratio | 1.032 | 1.032 |
| Lap Shear Strength (MPa) | 27.7 | 24.4 |
| Elongation (%) | 4.8 | 3.5 |
| Tensile Strength (MPa) | 66 | 61 |
| Modulus (MPa) | 2444 | 3211 |
| (data range) | (2246-2673) | (3160-3269) |

Part E—Evaluation of 2K Adhesives with Graphenic Carbon Particles; Evaluation of 2K Adhesive Systems with Rubber Particles Having a Core-Shell Structure The following examples compare 2K adhesive compositions with graphenic carbon particles (Example 2) or with rubber particles having a core-shell structure (Example 3). The formulations for the first component (Part 1) and second component (Part 2) of the 2K adhesive compositions are shown in Table 4.

In the example utilizing graphenic carbon particles, twenty grams of xGnP® Graphene Nanoplatelets (Grade C surface area 750 m²/g (available from XG Sciences Corporation)) was added to pre-weighed Epon® 828 (180 grams available from Hexion Specialty Chemicals Corporation) and the mixture was hand-mixed with spatula inside a laboratory glove box. The mixture was then poured into a three-roll mill (manufactured by Kent Industrial U.S.A. Inc) and ground 6 times. The graphene ground Epon® 828 was poured out from the mill and introduced to the mixture as in Example 2 below.

TABLE 4

| Formula | Ex. 1 | Ex. 2 | Ex. 3 |
|---|---|---|---|
| Part 1 | | | |
| Epon ® 828[1] | 41.05 | — | 38 |
| Epon ® 828/Terathane 650/HHPA[13] | 13 | 13 | 5 |
| 10% Graphenic carbon particles in Epon ® 828[14] | — | 45.61 | — |
| Kane Ace MX-153[15] | — | — | 9 |
| Part 2 | | | |
| Jeffamine D-230[5] | 10.35 | 10.35 | 10.35 |
| Jeffamine D-400[16] | 4.46 | 4.46 | 4.46 |
| Jeffamine XTJ-616[8] | 2.92 | 2.92 | 2.92 |
| IPDA[10] | 2.92 | 2.92 | 2.92 |
| 1,3-Bis(aminomethyl)cyclohexane[17] | 1.04 | 1.04 | 1.04 |
| Triethylenetetramine (TETA)[9] | 0.1 | 0.1 | 0.1 |
| Accelerator 399[11] | 0.08 | 0.08 | 0.08 |
| Tint AYD PC 9298[12] | 0.01 | 0.01 | 0.01 |
| Results | | | |
| Amine/Epoxy Ratio | 1.078 | 1.081 | 1.085 |
| Adhesive mechanical properties measured according to ISO527-1 & 2 | | | |
| Elongation (%) | 5.8 | 4.8 | 4.5 |
| Tensile Strength (MPa) | 55.1 | 53.6 | 50.3 |
| Modulus (MPa) | 2663 | 4041 | 2616 |
| (data range) | (2548-2861) | (3571-4505) | (2443-2958) |

[13]Epon ® 828/Terathane 650/Hexahydrophthalic anhydride adduct; EEW 412
[14]Available from XG Sciences, Graphenic carbon particles dispersion (10%) in Epon ® 828
[15]Core-shell poly(butadiene) rubber dispersion (33%) in Epon ® 828 available from Kaneka Texas Corporation
[16]Polyoxyalkeleneamine available from Huntsman
[17]1,3 bis(aminomethyl)cyclohexane (1,3-BAC) available from Mitsubishi Gas Chemical

Example 2—1K Adhesive Compositions

Part A—Synthesis of Polyether—Polyester Modified Epoxy Resin

To a four-neck flask fitted with condenser, thermometer, stirrer, and nitrogen inlet, add 321.3 grams of hexahydrophthalic anhydride and 677.7 grams of Terathane® 650. The mixture was heated to 100° C. with stirring under nitrogen atmosphere and the reaction was checked for an exotherm. After the exotherm subsided, the temperature was set at 150° C. and held until the anhydride peak at 1785 and 1855 CM-1 disappeared. The reaction mixture was then cooled to 120° C., wherein 1646.0 grams of EPON 828 and 15.0 grams of triphenyl phosphine were added. The reaction mixture was held at 120° C. until the acid value was below 2.2, resulting in a polyether-polyester modified epoxy resin having an epoxy equivalent weight of 412.

Part B—Synthesis of Polycaprolactone Diol Modified Epoxy Resin

To a suitable flask equipped with a reflux condenser and stirrer, add 211.9 grams of hexahydrophthalic anhydride and 570.6 grams of polycaprolactone CAPA 2085. The mixture was heated to 100° C. while stirring and held until the acid value was below 125 and the IR anhydride peaks at 1785 to 1855 CM-1 disappeared. The reaction mixture was then cooled to ambient temperature and 221 grams of this derivative was added into another flask equipped with a reflux condenser and stirrer. 310.6 grams of Epon® 828 (bisphenol A epichlorohydrin) and 3.00 grams of triphenylphosphine was added to the derivative, and the mixture was heated to 110° C. while stirring. The heating mantle was removed when the exotherm temperature peaked at about 145° C. to allow temperature to drop. The reaction temperature was then maintained at about 110° C. until the acid value of the mixture was below 2. The reaction mixture was then cooled to ambient temperature and stored. The polycaprolactone diol modified epoxy resin that resulted had a Molecular Weight by Number Average ($M_a$) of 2042 and an Epoxy Equivalent Weight (EEW) of 435.

Part C—Synthesis of Amide-Polyether-Polyester Modified Epoxy Resin 323.5 grams of Jeffamine D400 and 167.6 grams of E-caprolactone was added to a suitable flask equipped with a reflux condenser and stirrer. The mixture was heated to 150° C. while stirring until the MEQ amine value was below 0.75 MEQ/gm. The mixture was then cooled to 60° C., wherein 226.5 grams of hexahydrophthalic anhydride was added to the mixture while stirring. The mixture was then heated to 100° C. and held until the acid value was below 103. The mixture was then cooled to 60° C., wherein 1061.8 grams of Epon® 828 and 3.7 grams of Triphenylphosphine were added. The mixture was then heated to 110° C. while stirring and held at that temperature until the acid value was below 2. The mixture was then cooled to ambient temperature and stored. The resultant amide-polyether-polyester modified epoxy resin had a Molecular Weight by Number Average of 1664 and an epoxy equivalent weight (EEW) was 408.6.

Part D—Synthesis of Epoxy/Dimer Acid Adduct

Empol® 1022 Dimer acid (26.95 grams, available from Emory), Epon® 828 (32.96 grams available from Hexion) and triphenylphosphine (0.06 gram available from BASF) were added in a round-bottom flask, which was equipped with a mechanical stirrer, a reflux condenser. A thermometer and an addition funnel were attached. Nitrogen gas was briefly introduced into the flask. The flask was heated to 105° C. and the reaction continued until the acid value reached the desired range between 85 to 88 mg KOH per gram. An additional amount of Epon® 828 (40.03 grams) was added to the flask through a funnel at 105° C. and nitrogen gas was briefly introduced inside the flask. The flask was heated to 116° C. A mild exothermic reaction took place and the reaction temperature rose to 177° C. The flask temperature was returned to and kept under 168° C. by cooling. The reaction continued until the acid value became less than 1, wherein the flask was cooled to room temperature. This synthesis made a 43.6% epoxy/dimer acid adduct dispersed in an epoxy resin having an Epoxy Equivalent Weight (EEW) of 338.6.

Part E—Synthesis of Epoxy/CTBN Adduct

HYCAR 1300X8 carboxylic acid-terminated butadiene—acrylonitrile rubber (40 grams, available from Emerald Performance Materials Corporation) and Epon® 828 (60 grams) were added to a round-bottom flask, equipped with a mechanical stirrer, a thermometer and a reflux condenser. The flask was warmed to 115° C. under a nitrogen atmosphere. The mixture as then heated to 165° C. and stirred at that temperature until the acid value became less than 0.1, wherein the flask was cooled to room temperature. This synthesis made a 43.9% epoxy/CTBN adduct dispersed in an epoxy resin having an Epoxy Equivalent Weight (EEW) of 357.

Part F—Synthesis of Polyetheramine Modified Epoxy Resin 187 grams of Epon® 828 was added to a pint metal can and heated in a 95° C. oven for 30 minutes. The can was removed from the oven and was fitted with an air-motor driven mechanical stirrer with cowls blade for high shear mixing. 38.33 grams of Jeffamine D-400 was gradually added to the can under high-speed mixing, and the mixture was stirred for three hours. During this period, the temperature of the mixture, initially at about 120° C. (as measured by a thermocouple), was gradually decreased. After three hours, the can was cooled to room temperature. This synthesis made a polyetheramine modified epoxy resin.

Part G—Evaluation of 1K Adhesives

Test Methods

All the mechanical properties were tested on 1 mm thick Hot dip galvanized (HDG) substrate as supplied by Hovelmann & Lueg GmbH, Germany. Curing conditions for all the testing was 177° C. (350° F.) for 30 minutes.

An extension to the ISO 11343 method for wedge impact, "Adhesives—Determination of dynamic resistance to cleavage of high strength adhesive bonds under impact conditions—Wedge impact method" was used as described in Ford test method BU121-01. Three bond specimens were prepared for each testing condition.

Wedge Impact Bond Preparation: Cut 90 mm×20 mm coupons. Place Teflon™ tape around the coupons (both the upper and lower coupons) 30.0±0.2 mm from one end. Then apply the adhesive to the top 30 mm. The bond-line thickness is maintained with 0.25 mm (10 mil) glass beads. Remove adhesive squeeze out from the specimen edges with a spatula. Clamp specimens together to maintain flushness of coupon ends and sides. Bond assemblies are cured at 350° F. (177° C.) for 30 minutes. Then remove any excess adhesive from the edges by sanding and ensuring a flat and parallel impact end allowing hammer to impact the entire specimen simultaneously. Mark coupons 40.0±0.2 mm from the bonded end as a locator for consistent placement on wedge. Place specimen on wedge, aligning mark on specimen with tip of wedge such that it is at the same place on the wedge each time. Do not prebend the specimens; however, allow the unbonded portion of the specimens to conform to the shape of the wedge as the specimens are placed on the wedge. An Instron Dynatup Model 8200 Impact Test frame in conjunction with an integrated software package provided the means for load application and data acquisition respectively. The test frame was set-up with the objective of obtaining a minimum impact energy of 150 joules (110.634 lbf*ft) and an impact speed of at least 2 meters/second (6.562 ft./sec).

Bonds were conditioned at room temperature for at least 24 hours. Bonds were pulled apart using an Instron model 5567 in tensile mode.

Lap-Shear Testing: 25 mm×100 mm Coupons were cut and scribed at one end at 12.5 mm. Adhesive was applied evenly on one of the coupons within the scribed area for each bond assembly. Uniformity of bond thickness is insured by adding 0.25 mm (10 mil) glass spacer beads. Spacer beads should be sprinkled evenly over the material, covering no more than 5% of the total bond area. The other test coupon is placed on the bond area and spring-loaded clips, such as Binder Clips from Office Max or Mini Spring Clamp from Home Depot, are attached, one to each side of the bond, to hold the assembly together during bake. Excess squeeze out is removed with a spatula before baking. Bond assemblies were cured as specified, and after cooling, remaining excess was sanded. Bonds were conditioned at room temperature for at least 24 hours. Bonds were pulled apart using an Instron model 5567 in tensile mode.

T-peel: Cut metal substrate in pairs of 25 mm×87.5 mm in dimension. Make a 90° bend at 12.5 mm from one end on a vise so that paired pieces make T-shaped configuration: ] [ when bonded together. Apply a thin layer of adhesive on the three-inch portion of bonding side of one piece. Apply 0.25 mm diameter glass spacer beads evenly over the total bond area making sure to cover 5% of total bond area. Place two pieces together forming a T-shaped configuration known as T-PEEL assembly. Place 3 medium binder clips on the T-PEEL assembly to hold it together. Remove excess squeeze out of adhesive with a spatula prior to baking the assemblies in a preconditioned oven at a given temperature specified. Allow samples to cool, then remove binder clips, and sand any remaining excess squeeze out. Pull samples on INSTRON 5567 at rate of 127 mm per minute. T-Peel assemblies in Instron jaws are conditioned in an environmental chamber for at least 30 minutes and tested within the chamber in case of −30° C. testing. Instron 5567 calculates results in pounds per linear inch or Newton per mm through internal computer program.

Evaluation of 1K Adhesive Compositions with Various Epoxy-Capped Flexibilizers and Rubber Particles Having a Core/Shell Structure The following examples compare 1K adhesive compositions in accordance with certain embodiments of the present invention. The formulations are shown in Table 5 and the mechanical performance of the 1K adhesive compositions is shown in Tables 6-9, respectively.

TABLE 5

|  | Ex. 1 | Ex. 2 | Ex. 3 | Ex. 4 | Ex. 5 |
| --- | --- | --- | --- | --- | --- |
| Epon 828/Dimer Acid[18] | 4 | 12 | 4 | 4 | 4 |
| Epon 828/CTBN[19] | 12 | 16 | 12 | 12 | 12 |
| Kane Ace MX-153[20] | 37.5 | 21 | 37.5 | 37.5 | 37.5 |
| Epon 828[1] | — | 6.5 | — | — | — |
| Epon 828/Terathane 650/HHPA[21] | 10 | 10 | — | — | — |
| Epon 828/Jeffamine D-400[22] | — | — | 10 | — | — |
| Epon 828/Caprolactone/HHPA[23] | — | — | — | 10 | — |

TABLE 5-continued

|  | Ex. 1 | Ex. 2 | Ex. 3 | Ex. 4 | Ex. 5 |
|---|---|---|---|---|---|
| Epon 828/Caprolactone/Jeffamine D-400/HHPA[24] | — | — | — | — | 10 |
| Dicyandiamide[25] | 5.1 | 5.1 | 5.1 | 5.1 | 5.1 |
| Diuron[26] | 0.35 | 0.35 | 0.35 | 0.35 | 0.35 |
| Raven 410 Carbon Black[27] | 0.06 | 0.06 | 0.06 | 0.06 | 0.06 |
| Calcium Oxide[28] | 3.1 | 3.1 | 3.1 | 3.1 | 3.1 |
| Wacker HDK H17[29] | 2.75 | 3.25 | 2.5 | 2.75 | 2.5 |

[18]Synthesis example from Example 2, Part D above.
[19]Synthesis example from Example 2, Part E above.
[20]Core/shell poly(butadiene) rubber dispersion (33%) in Epon® 828 available from Kaneka Texas Corp.
[21]Synthesis example from Example 2, Part A above.
[22]Synthesis example from Example 2, Part F above.
[23]Synthesis example from Example 2, Part B above.
[24]Synthesis example from Example 2, Part C above.
[25]Heat activated latent curing agent available from ALZ Chem.
[26]Catalytically active substituted urea available from ALZ Chem
[27]Carbon black available from Phelps Dodge - Columbian Chemicals
[28]Calcium oxide available from Mississippi Lime, Co.
[29]Hydrophobic Fumed Silica available from Wacker Chemie AG.

TABLE 6

Adhesive mechanical properties measured according to ISO527-1 & 2

|  | Temp. | Ex. 1 | Ex. 2 | Ex. 3 | Ex. 4 | Ex. 5 |
|---|---|---|---|---|---|---|
| Elongation (%) Pull Rate - 1 mm/min. | Room Temp (RT) | 10.3 | 6.0 | — | — | — |
| Tensile Strength (MPa) Pull Rate - 1 mm/min. | RT | 42 | 38 | — | — | — |
| Modulus (MPa) Pull Rate - 1 mm/min. | RT | 2559 | 2421 | — | — | — |

TABLE 7

| Lap Shear Strength (MPA) | Temp. | Ex. 1 | Ex. 2 | Ex. 3 | Ex. 4 | Ex. 5 |
|---|---|---|---|---|---|---|
| Bond area - 25 × 10 × 0.2 mm GM - SAEJ1523 Pull Rate - 10 mm/min. | −40° C. | 31.4 | 28.4 | 29.1 | 28.4 | 29.6 |
|  | RT | 25.3 | 24.5 | 23.5 | 24.9 | 25.8 |
|  | +80° C. | 22.2 | 20.3 | 21.9 | 20.7 | 21.6 |

TABLE 8

| T-Peel Strength (N/mm) | Temp. | Ex. 1 | Ex. 2 | Ex. 3 | Ex. 4 | Ex. 5 |
|---|---|---|---|---|---|---|
| Bond area - 25 × 75 × 0.2 mm GM - ASTM D1876 Pull Rate - 127 mm/min. | −40° C. | 17.6 | 13.8 | 17.2 | 16.2 | 15.1 |
|  | RT | 15.3 | 9.3 | 10.5 | 10.6 | 16.4 |
|  | +80° C. | 9.0 | 8.3 | 6.5 | 8.0 | 8.7 |

TABLE 9

| Impact Peel Strength (N/mm) | Temp. | Ex. 1 | Ex. 2 | Ex. 3 | Ex. 4 | Ex. 5 |
|---|---|---|---|---|---|---|
| Bond area - 25 × 30 × 0.2 mm ISO 11343 modified | −40° C. | 5.8-9.8 | 3.4-9.4 | — | — | — |
|  | RT | 36.9-41.3 | 29.1-35.1 | — | — | — |
| Ford BU-12-01 (2 m/s speed, 150 joules impact energy) | +80° C. | 31.3-36.9 | 33.5-42.9 | — | — | — |

Example 3

1K Adhesive Compositions Containing Epoxy Amine or Epoxy Imidazole Catalysts

The following examples compare 1K adhesive compositions with various types of epoxy-amine or epoxy-imidazole catalysts (Example 1-4) and the effects of a chelating agent (Example 4).

TABLE 10 *

|  | Example 1 | Example 2 | Example 3 | Example 4 |
|---|---|---|---|---|
| Kane Ace MX-153[30] | 48 | 48 | 48 | 48 |
| Epon 828/Terathane 650/HHPA[31] | 13.4 | 13.4 | 13.4 | 13.4 |
| Epon 828/Dimer Acid Adduct[32] | 5 | 5 | 5 | 5 |
| 1,10-Phenanthroline[34] | — | — | — | 1 |
| TINT-AYD ST 8703[36] | — | — | 0.1 | 0.1 |
| Raven 410[37] | 0.06 | 0.06 | — | — |
| Mica A-325[38] | 3.3 | 3.3 | 1 | 1 |
| Calcium Oxide[39] | 3.1 | 3.1 | 2 | 2 |
| HDK H17[40] | 1.1 | 1.1 | 1.1 | 1.1 |
| Dyhard 100SF[41] | 6.8 | 6.8 | 3.4 | 3.4 |
| Ajicure MY-25[42] | — | — | — | 1.5 |
| Ajicure PN-40[43] | 1.5 | — | 2 | 1.5 |
| Ajicure PN-50[44] | — | 1.5 | — | — |
| Diuron[46] | — | — | — | 0.3 |

Bake: 130° C. metal temperature for 10 minutes
Lap shear strength (MPa)
HDG metal - 1 mm thick; Bond area: 20 mm × 10 mm × 0.25 mm

| Room Temperature | 18.5 | 18.4 | 17.7 | 15.6 |

Water Soak, 54° C./7 days, 24 hrs dry
Lap shear strength (MPa) | 11.6 | 12.7 | 11.6 | 11.7

T-Peel strength (N/mm)
HDG metal - 0.7 mm thick; Bond area: 20 mm × 70 mm × 0.25 mm

| Room Temperature | 9.0 | 5.6 | 4.3 | 7.6 |

EZG metal - 0.7 mm thick; Bond area: 20 mm × 70 mm × 0.25 mm

| Room Temperature | 6.3 | 3.8 | 4.1 | 8.2 |

The following examples compare adhesive compositions with varying combinations of epoxy resins.

TABLE 11 *

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Kane Ace MX-153[30] | 48 | 48 | 53.12 | 53 | 48 | 48 | 48 | 48 | 48 | 48 |
| Epon 828/Terathane 650/HHPA[31] | 13.4 | 13.4 | 13.28 | 13.4 | 13.4 | 13.4 | 9.9 | 10.4 | 18.4 | 13.4 |
| Epon 828/Dimer Acid Adduct[32] | — | 5 | — | — | 1.5 | 1.5 | 5 | 8 | — | 1.5 |
| Epon 828/CTBN Adduct[33] | 5 | — | — | — | 3.5 | 3.5 | 3.5 | — | — | 3.5 |
| 1,10-Phenanthroline[34] | — | — | — | 1 | — | — | 0.4 | 0.4 | 0.4 | 0.4 |
| Halox SW 111[35] | — | — | — | — | — | — | 0.4 | 0.4 | 0.4 | 0.4 |
| TINT-AYD ST 8703[36] | 0.1 | 0.1 | 0.1 | 0.1 | 0.1 | 0.1 | 0.1 | 0.1 | 0.1 | 0.1 |
| Mica A-325[38] | 1 | 1 | 1 | 1 | 1 | 1 | 1 | 1 | 1 | 1 |
| Calcium Oxide[39] | 2 | 2 | 2 | 2 | 2 | 2 | 2 | 2 | 2 | 2 |
| HDK H17[40] | 1.1 | 1.1 | 1.1 | 1.1 | 1.1 | — | 1.1 | 1.1 | 1.1 | 1.1 |
| Dyhard 100SF[41] | 3.4 | 3.4 | 3.4 | 3.4 | 3.4 | 3.4 | 3.4 | 3.4 | 3.4 | 3.4 |

TABLE 11 *-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Ajicure MY-25[42] | 0.5 | 0.5 | — | — | 0.5 | 0.5 | 0.5 | 0.5 | 0.5 | — |
| Ajicure PN-40[43] | 1.5 | 1.5 | 2 | 2 | 1.5 | 1.5 | 1.5 | 1.5 | 1.5 | 1.5 |
| Technicure PPG-1[45] | — | — | — | — | — | — | — | — | — | 1 |
| Diuron[46] | 0.3 | 0.3 | 0.3 | 0.3 | 0.3 | 0.3 | 0.3 | 0.3 | 0.3 | 0.3 |

Bake: 130° C. metal temperature for 10 minutes
Lap shear strength (MPa)
HDG metal - 1 mm thick; Bond area: 20 mm × 10 mm × 0.25 mm

| Room Temperature | 14.6 | 14.5 | 19.3 | 17.9 | 20.0 | 12.0 | 17.9 | 18.4 | 21.0 | 18.3 |

Water Soak, 54° C./7 days, 24 hrs dry
Lap shear strength (MPa)

|  | 10.8 | 10.3 | 9.8 | 13.1 | 13.5 | — | 13.6 | 12.6 | 14.2 | 13.8 |

T-Peel strength (N/mm)
HDG metal - 0.7 mm thick; Bond area: 20 mm × 70 mm × 0.25 mm

| Room Temperature | 5.4 | 5.8 | 2.8 | 1.7 | 7.0 | 4.9 | 1.3 | 2.0 | 3.5 | 3.6 |

EZG metal - 0.7 mm thick; Bond area: 20 mm × 70 mm × 0.25 mm

| Room Temperature | 3.5 | 6 | 6.6 | 3.7 | 6.1 | 3.4 | 5.1 | 5.5 | 6.1 | 7.9 |

Test Methods

Lap shear properties were tested on 1 mm thick hot dip galvanized (HDG) steel substrate as supplied by Hovelmann & Lueg GmbH, Germany. T-peel properties were tested on 0.7 mm thick hot dip galvanized and electogalvanized (EZG) steel panels as supplied by ACT Test Panels. Curing conditions for all the testing was 130° C. (266° F.) metal temperature for 10 minutes.

Lap-Shear Testing: 20 mm×90 mm coupons were cut and scribed at one end at 10 mm. Adhesive was applied evenly on one of the coupons within the scribed area for each bond assembly. Uniformity of bond thickness was insured by adding 0.25 mm (10 mil) glass spacer beads. Spacer beads were sprinkled evenly over the material to cover no more than 5% of the total bond area. The other test coupon was placed on the bond area and spring-loaded clips, such as Binder Clips from Office Max or Mini Spring Clamp from Home Depot, were attached, one to each side of the bond, to hold the assembly together during bake. Excess squeeze out was removed with a spatula before baking. Bond assemblies were cured as specified, and after cooling, remaining excess was sanded. Bonds were conditioned at room temperature for at least 24 hours. Bonds were pulled apart using an Instron model 5567 in tensile mode.

Water soak: Assemblies prepared in the same manner as those for lap-shear testing were made and placed in a 54° C. water tank for 7 days. After removing the assemblies from the water tank at the end of 7 days, the assemblies were dried for 24 hours before testing. The test specimens were pulled with Instron mode 5567 using the same lap-shear test method as described above.

T-peel: Metal substrate was cut in pairs of 1 inch×4 inch in dimension. A 90° bend was at 0.5 inch from one end on a vise so that paired pieces made a T-shaped configuration: ][, when bonded together. A thin layer of adhesive was applied on the unbent portion of bonding side of one piece. A 0.25 mm diameter glass spacer beads were applied evenly over the total bond area to cover 5% of total bond area. Two pieces were placed together to form a T-shaped configuration known as T-PEEL assembly. Two large binder clips were placed on each side of the T-PEEL assembly to hold it together. Excess squeeze out of adhesive was removed with a spatula prior to baking the assemblies in a preconditioned oven at a specified temperature. The samples were cooled, the binder clips were removed, and any remaining excess squeeze out was sanded. Samples were pulled on INSTRON 5567 at rate of 50 mm per minute. Instron 5567 calculated results in Newton per mm through an internal computer program.

Whereas particular embodiments of this invention have been described above for purposes of illustration, it will be evident to those skilled in the art that numerous variations of the details of the present invention may be made without departing from the invention as defined in the appended claims.

We claim:

1. A one-component composition comprising:
   (a) an epoxy-capped flexibilizer comprising a reaction product of reactants comprising (i) a first epoxy compound, (ii) a polyol, and (iii) a diacid;
   (b) a heat-activated latent curing agent comprising (x) a reaction product of reactants comprising (i) a second epoxy compound and (ii) an amine, an alkaloid, or combinations thereof, and (y) dicyandiamide having a D98 of 6 μm;
   (c) an optional epoxy/CTBN adduct;
   (d) an epoxy/dimer acid adduct;
   (e) rubber particles having a core/shell structure;
   (f) optional graphenic carbon particles; and
   an epoxy compound or an epoxy resin not incorporated into or reacted as a part of any of the components (a)-(f) and/or an epoxy carrier resin incorporated into the component (e).

2. The one-component composition of claim 1, which comprises at least one of:
   2% by weight to 40% by weight, based on total weight of the composition, of the epoxy-capped flexibilizer (a);
   3% by weight to 25% by weight, based on total weight of the composition, of the heat-activated latent curing agent (b);
   a positive amount of up to 75% by weight, based on total weight of the composition, of the rubber particles having a core/shell structure (e); and
   1% by weight to 15% by weight, based on total weight of the composition, of the epoxy/dimer acid adduct (d).

3. The one-component composition of claim 1, wherein the first epoxy compound reactant (i) of the epoxy-capped flexibilizer (a) comprises Bisphenol A diglycidyl ether, phenyl diglycidyl ether, or combinations thereof.

4. The one-component composition of claim 1, wherein the polyol reactant (ii) of the epoxy-capped flexibilizer (a) has a hydroxy equivalent weight of 30 to 1000.

5. The one-component composition of claim 1, wherein the polyol reactant (ii) of the epoxy-capped flexibilizer (a) comprises ethylene glycol, propylene glycol, butylene glycol, hexylene glycol, polyether diols of any of the foregoing, polyester diols, urethane diols or combinations thereof.

6. The one-component composition of claim 5, wherein the polyester diol is synthesized by ring opening polymerization of caprolactone.

7. The one-component composition of claim 5, wherein the urethane diol is synthesized by reaction of a cyclic carbonate with a diamine.

8. The one-component composition of claim 1, wherein the polyol reactant (ii) of the epoxy-capped flexibilizer (a) comprises polytetrahydrofuran, a diol derived from caprolactone or combinations thereof.

9. The one-component composition of claim 1, wherein the reactants of the epoxy-capped flexibilizer (a) further comprise an anhydride.

10. The one-component composition of claim 1, wherein (x) is a reaction product of reactants comprising (i) a second epoxy compound and (ii) an alkaloid, which are provided in a molar ratio of (i) to (ii) of 1:1 to 3:1.

11. The one-component composition of claim 1, wherein (x) is a reaction product of reactants comprising (i) a second epoxy compound and (ii) an amine, which are provided in a molar ratio of (i) to (ii) of 1:2 to 8:9.

12. The one-component composition of claim 1, wherein (x) is a reaction product of reactants comprising (i) a second epoxy compound and (ii) an amine or an alkaloid.

13. The one-component composition of claim 12, wherein the alkaloid comprises an imidazole.

14. The one-component composition of claim 1, wherein the heat-activated latent curing agent (b) further comprises 3,4-dichlorophenyl-N,N-dimethyl urea.

15. The one-component composition of claim 1, wherein at least one of the epoxy/CTBN adduct (c) and the graphenic carbon particles (f) is present in the composition.

16. The one-component composition of claim 15, wherein the epoxy/CTBN adduct (c) is formed from CTBN having a functionality of 1.6 to 2.4.

17. The one-component composition of claim 1, wherein the epoxy/CTBN adduct (c) is present in an amount of 1% by weight to 20% by weight, based on total weight of the composition.

18. The one-component composition of claim 1, further comprising 1,10-phenanthroline as a chelating agent.

19. The one-component composition of claim 1, wherein the composition is formulated to cure at a temperature of 120° C. to 140° C. within 20 minutes or less.

20. The one-component composition of claim 1, wherein the composition is formulated to cure following exposure to thermal conditions or actinic radiation.

21. A method of treating a substrate, comprising:
applying the composition of claim 1 to a surface of the substrate.

22. The method of claim 21, further comprising heating the composition at a temperature of 120° C. to 140° C.

23. The method of claim 21, further comprising exposing the composition to thermal conditions or actinic radiation for 20 minutes or less.

24. An article comprising:
a coating formed on a surface of a substrate from the composition of claim 1.

25. The article of claim 24, further comprising a second substrate, wherein the composition is positioned between the surface and the second substrate.

26. The article of claim 25, wherein the coating has a measured lap shear strength of at least 15 MPa when tested at room temperature.

27. An automotive component comprising the article of claim 24.

28. A wind turbine comprising the article of claim 24.

* * * * *